(12) United States Patent
Klopp et al.

(10) Patent No.: US 12,478,240 B2
(45) Date of Patent: Nov. 25, 2025

(54) METHOD OF CONTROLLING A ROBOTIC FLOOR CLEANING MACHINE

(71) Applicant: Nilfisk A/S, Broendby (DK)

(72) Inventors: Stephen Klopp, Champlin, MN (US); Stuart McDonald, Minnetonka, MN (US); Kipp Knutson, Shorewood, MN (US); David Wood, Delano, MN (US); Andrew Graham, Maple Grove, MN (US); Christian Kraft, Roskilde (DK); Donald Joseph Legatt, St. Michael, MN (US)

(73) Assignee: Nilfisk A/S, Broendby (DK)

( * ) Notice: Subject to any disclaimer, the term of this patent is extended or adjusted under 35 U.S.C. 154(b) by 653 days.

(21) Appl. No.: 17/842,704

(22) Filed: Jun. 16, 2022

(65) Prior Publication Data

US 2022/0313046 A1    Oct. 6, 2022

Related U.S. Application Data

(63) Continuation-in-part of application No. 16/885,835, filed on May 28, 2020, now Pat. No. 11,432,698, (Continued)

(51) Int. Cl.
*A47L 11/40* (2006.01)
*A47L 11/30* (2006.01)

(52) U.S. Cl.
CPC ......... *A47L 11/4011* (2013.01); *A47L 11/305* (2013.01); *A47L 11/4008* (2013.01);
(Continued)

(58) Field of Classification Search
CPC ............. A47L 2201/04; A47L 2201/06; A47L 11/4011; A47L 11/305; A47L 11/4061;
(Continued)

(56) References Cited

U.S. PATENT DOCUMENTS

| | | |
|---|---|---|
| 3,753,777 A | 8/1973 | Thomsen et al. |
| 4,114,711 A | 9/1978 | Wilkins |

(Continued)

FOREIGN PATENT DOCUMENTS

| | | |
|---|---|---|
| DE | 10240227 A1 | 3/2004 |
| DE | 102013113426 A1 | 6/2014 |

(Continued)

OTHER PUBLICATIONS

Communication pursuant to Rule 114(2) EPC from EP Application No. 16837867.7, dated Jun. 7, 2021, 5 Pages.
(Continued)

*Primary Examiner* — Joel D Crandall
(74) *Attorney, Agent, or Firm* — Dicke, Billig & Czaja, PLLC

(57) ABSTRACT

A method of controlling a robotic floor cleaning machine includes driving, by an operator, the robotic floor cleaning machine along a transport path and a cleaning path. The transport path defines a path for transport of the robotic floor cleaning machine without active cleaning and the cleaning path defines a path for a cleaning operation. The method further includes recording the transport path and the cleaning path driven by the operator; defining, in a controller of the robotic floor cleaning machine, a route comprising the recorded transport path and the recorded cleaning path, and defining the cleaning operation. The robotic floor cleaning machine executes the defined route and the cleaning operation.

20 Claims, 7 Drawing Sheets

Related U.S. Application Data which is a continuation of application No. 15/240,991, filed on Aug. 18, 2016, now abandoned.

(60) Provisional application No. 62/206,673, filed on Aug. 18, 2015.

(52) U.S. Cl.
CPC ....... *A47L 11/4016* (2013.01); *A47L 11/4036* (2013.01); *A47L 11/4044* (2013.01); *A47L 11/4061* (2013.01); *A47L 11/4066* (2013.01); *A47L 11/4083* (2013.01); *A47L 11/4088* (2013.01); *A47L 2201/04* (2013.01); *A47L 2201/06* (2013.01)

(58) Field of Classification Search
CPC ...... A47L 9/2857; A47L 9/2805; A47L 11/24; A47L 11/28; G05D 1/0274; G05D 1/0221
USPC .................................................... 15/319, 320
See application file for complete search history.

(56) References Cited

U.S. PATENT DOCUMENTS

| | | | |
|---|---|---|---|
| 4,922,572 A * | 5/1990 | Kohl | A47L 11/4083 15/353 |
| 5,086,535 A | 2/1992 | Grossmeyer et al. | |
| 5,279,672 A | 1/1994 | Betker et al. | |
| 5,341,540 A * | 8/1994 | Soupert | G05D 1/0234 180/169 |
| 5,995,883 A | 11/1999 | Nishikado | |
| 6,574,536 B1 | 6/2003 | Kawagoe et al. | |
| 7,103,270 B1 * | 9/2006 | Chen | A47L 11/34 392/394 |
| 7,113,847 B2 | 9/2006 | Chmura et al. | |
| 8,528,142 B1 | 9/2013 | Pedlar et al. | |
| 8,871,030 B2 * | 10/2014 | Chen | G05D 1/0274 15/340.1 |
| 8,887,340 B2 | 11/2014 | Pedlar et al. | |
| 2002/0153184 A1 | 10/2002 | Song et al. | |
| 2004/0020000 A1 | 2/2004 | Jones | |
| 2004/0181896 A1 | 9/2004 | Egawa et al. | |
| 2004/0211444 A1 | 10/2004 | Taylor et al. | |
| 2006/0184293 A1 * | 8/2006 | Konandreas | A47L 11/4083 701/23 |
| 2006/0200282 A1 * | 9/2006 | Lee | G05D 1/0225 701/23 |
| 2006/0241814 A1 * | 10/2006 | Jung | G05D 1/0225 700/259 |
| 2007/0061040 A1 | 3/2007 | Augenbraun et al. | |
| 2007/0209143 A1 | 9/2007 | Choi et al. | |
| 2008/0127445 A1 | 6/2008 | Konandreas et al. | |
| 2009/0133720 A1 | 5/2009 | Van | |
| 2010/0211244 A1 | 8/2010 | Jeong et al. | |
| 2011/0004339 A1 | 1/2011 | Ozick et al. | |
| 2011/0004342 A1 | 1/2011 | Knopow et al. | |
| 2011/0046784 A1 | 2/2011 | Anderson | |
| 2011/0202175 A1 * | 8/2011 | Romanov | B25J 13/08 700/250 |
| 2012/0260944 A1 | 10/2012 | Martins et al. | |
| 2013/0041526 A1 * | 2/2013 | Ouyang | A01D 34/008 701/2 |
| 2013/0056032 A1 * | 3/2013 | Choe | G05D 1/0038 15/3 |
| 2013/0238130 A1 | 9/2013 | Dorschel | |
| 2013/0261867 A1 | 10/2013 | Burnett et al. | |
| 2013/0345922 A1 * | 12/2013 | Biber | G05D 1/0274 701/25 |
| 2014/0166047 A1 | 6/2014 | Hillen et al. | |
| 2014/0188325 A1 | 7/2014 | Johnson et al. | |
| 2014/0209122 A1 * | 7/2014 | Jung | A47L 11/24 15/3 |
| 2014/0230179 A1 | 8/2014 | Matsubara et al. | |
| 2014/0278252 A1 | 9/2014 | Wold et al. | |
| 2014/0289992 A1 | 10/2014 | Ziegler et al. | |
| 2015/0335219 A1 | 11/2015 | Noh et al. | |
| 2016/0169692 A1 | 6/2016 | Gupta | |
| 2019/0179307 A1 | 6/2019 | Anderson et al. | |

FOREIGN PATENT DOCUMENTS

| | | |
|---|---|---|
| DE | 102014106975 A1 | 11/2015 |
| EP | 2725443 A2 | 4/2014 |
| EP | 2801313 A2 | 11/2014 |
| FR | 2846586 A1 | 5/2004 |
| FR | 2846587 A1 | 5/2004 |
| JP | 2007520323 A | 7/2007 |
| KR | 20110127946 A | 11/2011 |
| WO | 2013130734 A1 | 9/2013 |
| WO | 2015041036 A1 | 3/2015 |
| WO | 2017031365 A1 | 2/2017 |

OTHER PUBLICATIONS

Extended European Search Report for EP Application No. 16837867.7, dated Mar. 15, 2019, 7 pages.
International Preliminary Report on Patentability for PCT Application Serial No. PCT/US2016/47638, dated Feb. 20, 2018, 9 pages
International Search Report and Written Opinion from PCT Application Serial No. PCT/US2016/47638, dated Nov. 2, 2016, 10 pages.
Communication pursuant to Rule 114(2) EPC from EP Application No. 16837867.7, dated Jun. 10, 2024, 4 Pages.

* cited by examiner

METHOD OF CONTROLLING A ROBOTIC FLOOR CLEANING MACHINE

CROSS-REFERENCE TO RELATED APPLICATION(S)

This application is a continuation-in-part of U.S. application Ser. No. 16/885,835, filed on May 28, 2020, for "MOBILE ROBOTIC CLEANER" by K. Knutson, S. McDonald, S. Klopp, J. Black, D. Wood and D. Legatt which is a continuation of U.S. application Ser. No. 15/240,991, filed Aug. 18, 2016, for "MOBILE ROBOTIC CLEANER" by K. Knutson, S. McDonald, S. Klopp, J. Black, D. Wood and D. Legatt, which in turn claims the benefit of U.S. Provisional Application No. 62/206,673, filed Aug. 18, 2015, for "MOBILE ROBOTIC CLEANER" by K. Knutson, S. McDonald, S. Klopp, J. Black, D. Wood and D. Legatt.

TECHNICAL FIELD

The present patent application relates generally to a cleaning apparatus. More specifically, the present patent application relates, but not by way of limitation, to various features of a mobile robotic cleaner for autonomous floor cleaning.

BACKGROUND

Industrial and commercial floors are cleaned on a regular basis for aesthetic and sanitary purposes. There are many types of industrial and commercial floors ranging from hard surfaces such as concrete, terrazzo, wood, and the like, which can be found in factories, schools, hospitals, and the like, to softer surfaces such as carpeted floors found in restaurants and offices. Different types of floor cleaning equipment such as scrubbers, sweepers, and extractors, have been developed to properly clean and maintain these different floor surfaces.

For example, a typical industrial or commercial scrubber is a walk-behind or drivable, self-propelled, wet process machine that applies a liquid cleaning solution from an onboard cleaning solution tank onto the floor through nozzles. Rotating brushes forming part of the scrubber agitate the solution to loosen dirt and grime adhering to the floor. The dirt and grime become suspended in the solution, which is collected by a vacuum squeegee fixed to a rearward portion of the scrubber and deposited into an onboard recovery tank.

Floor cleaning units can also be designed as unmanned, robotic units that operate autonomously. However, there are particular challenges in automating the cleaning process of an autonomous scrubber, particularly for large, industrial or commercial floor cleaning systems that can be employed unsupervised in areas where there is pedestrian traffic. In addition to providing an adequate guidance or navigation system that prevents the unmanned, robotic unit from engaging objects or entering prohibited areas, the cleaning operation itself must be managed to ensure the unmanned, robotic unit is actually performing as intended.

Overview

In an example, a control system for a robotic floor cleaning machine configured to perform a cleaning operation along a cleaning path can comprise a controller, and a plurality of sensors. The controller can be configured to control autonomous movement of the robotic floor cleaning machine along the cleaning path and autonomous performance of the cleaning operation. The plurality of sensors can be configured to sense a location of the robotic floor cleaning machine relative to surroundings of the robotic floor cleaning machine. At least two sensors from the plurality of sensors are configured to locate the robotic floor cleaning machine in overlapping areas of the surroundings.

In another example, a robotic floor cleaning machine can comprise a chassis, a propulsion system, a primary cleaning mechanism, a control system, and means for facilitating autonomous performance of a cleaning operation. The propulsion system can be connected to the chassis to provide movement of the chassis along a cleaning path. The primary cleaning mechanism can be mounted to the chassis to perform the cleaning operation. The control system can be mounted to the robotic floor cleaning machine to control autonomous movement of the chassis and autonomous performance of the cleaning operation. Furthermore, the robotic floor cleaning machine can comprise a liquid system mounted to the chassis to provide cleaning liquid to the cleaning operation, and a recovery system mounted to the chassis to recover liquid from the cleaning operation.

In yet another example, a robotic floor cleaning machine can comprise a chassis, a propulsion system, a primary cleaning mechanism, a control system, and means for facilitating autonomous movement of the chassis. The propulsion system can be connected to the chassis to provide movement of the chassis along a cleaning path. The primary cleaning mechanism can be mounted to the chassis to perform a cleaning operation. The control system can be mounted to the robotic floor cleaning machine to control the autonomous movement of the chassis and autonomous performance of the cleaning operation. Furthermore, the robotic floor cleaning machine can comprise a liquid system mounted to the chassis to provide cleaning liquid to the cleaning operation, and a recovery system mounted to the chassis to recover liquid from the cleaning operation.

In yet another example, a method of controlling a robotic floor cleaning machine can comprise driving, by an operator, the robotic floor cleaning machine along a transport path and a cleaning path, wherein the transport path defines a path for transport of the robotic floor cleaning machine without active cleaning and the cleaning path defines a path for a cleaning operation; recording the transport path and the cleaning path driven by the operator; defining, in a controller of the robotic floor cleaning machine, a route comprising the recorded transport path and the recorded cleaning path, and defining the cleaning operation; and executing, by the robotic floor cleaning machine, the defined route and the cleaning operation.

In yet another example, a robotic floor cleaning machine can comprise a recorded transport path and a recorded cleaning path stored in a controller, a graphical user interface configured to allow an operator to select the recorded cleaning path and the cleaning operation, and a controller configured to define a route comprising the recorded transport path and the recorded cleaning path and execute the defined route and the cleaning operation. The recorded transport path defines a path for transport of the robotic floor cleaning machine without active cleaning. The recorded cleaning path defines a path for a cleaning operation

DETAILED DESCRIPTION

The present inventors have recognized, among other things, that a problem to be solved with autonomous or robotic floor cleaning equipment is the failure of such equipment to recognize its surroundings and adequately react to changes in those surroundings. The present inventors have also recognized that a problem to be solved with autonomous or robotic floor cleaning equipment is the failure of such equipment to recognize and react to deficiencies of the cleaning operation being performed.

The present subject matter can help provide a solution to these and other problems such as by providing a robotic or autonomous cleaning machine that can utilize a control system to accurately detect when the cleaning machine may collide with an object. Thus, in order to operate properly, the robotic cleaning machine should be able to detect objects directly ahead of the cleaning machine, including ahead of the left forward and the right forward edges of the cleaning machine. Robotic cleaning machines should not only be able to detect objects, but they also should be able to process the information regarding object detection in sufficient time to avoid the object. Mapping of a workspace is also a desirable feature, which can allow the robotic cleaning machine to clean along a desired cleaning path.

The present subject matter can help provide a solution to these and other problems such as by providing a robotic or autonomous cleaning machine that can include a control system to monitor the status of the cleaning operation. For example, the control system can include sensors to determine the presence of a scrubbing pad, a squeegee, level sensors to determine the level of clean and dirty cleaning liquid in a liquid storage tank and onboard recovery tank, respectively, moisture sensors to determine the presence of un-vacuumed cleaning liquid behind the machine, vibration sensors, object recognition sensors and the like.

Figure 1:
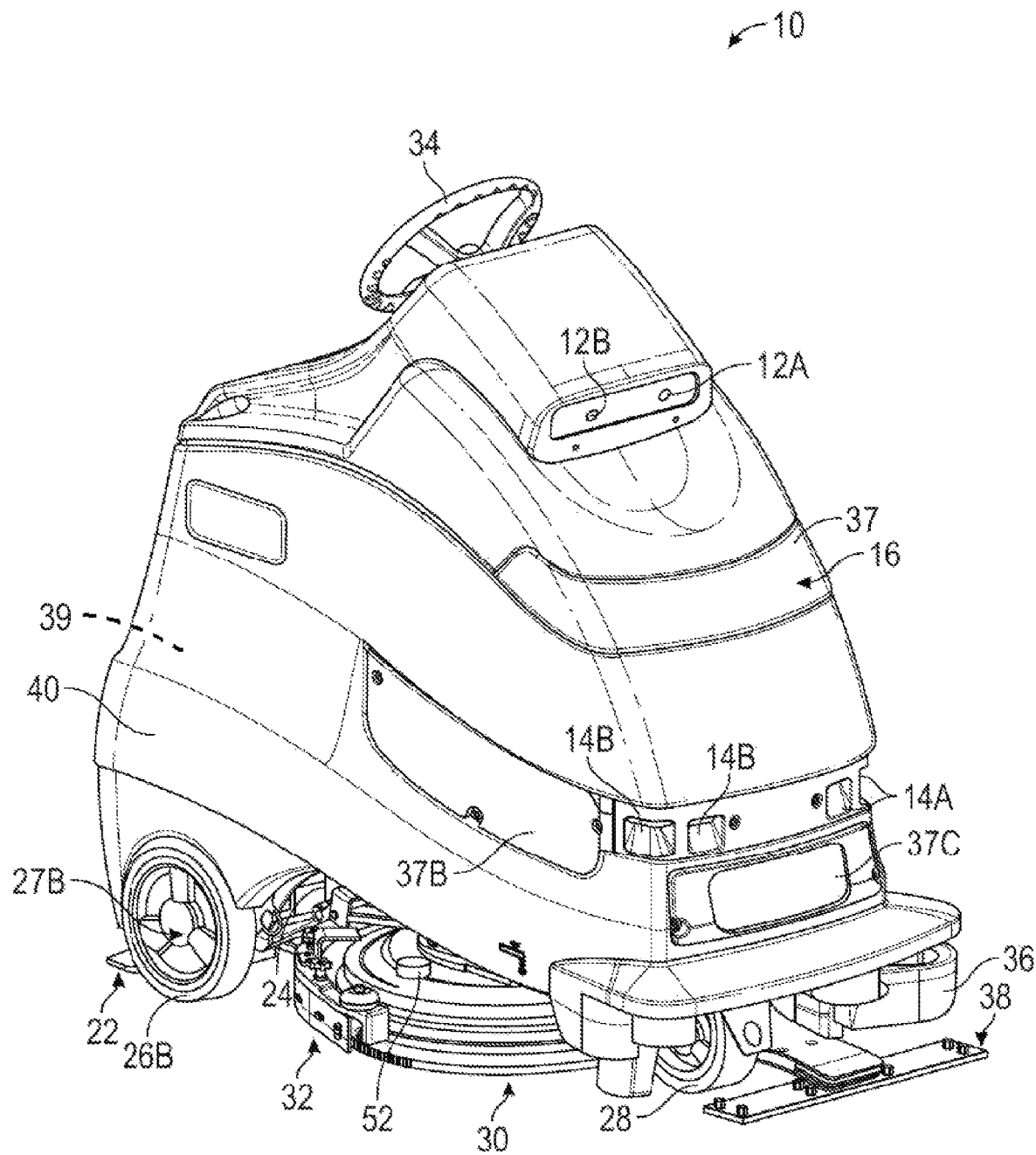
FIG. 1 is a front perspective view of a robotic floor cleaning machine having optical sensors, distance sensors, a laser scanner and a status light system.
Figure 2:
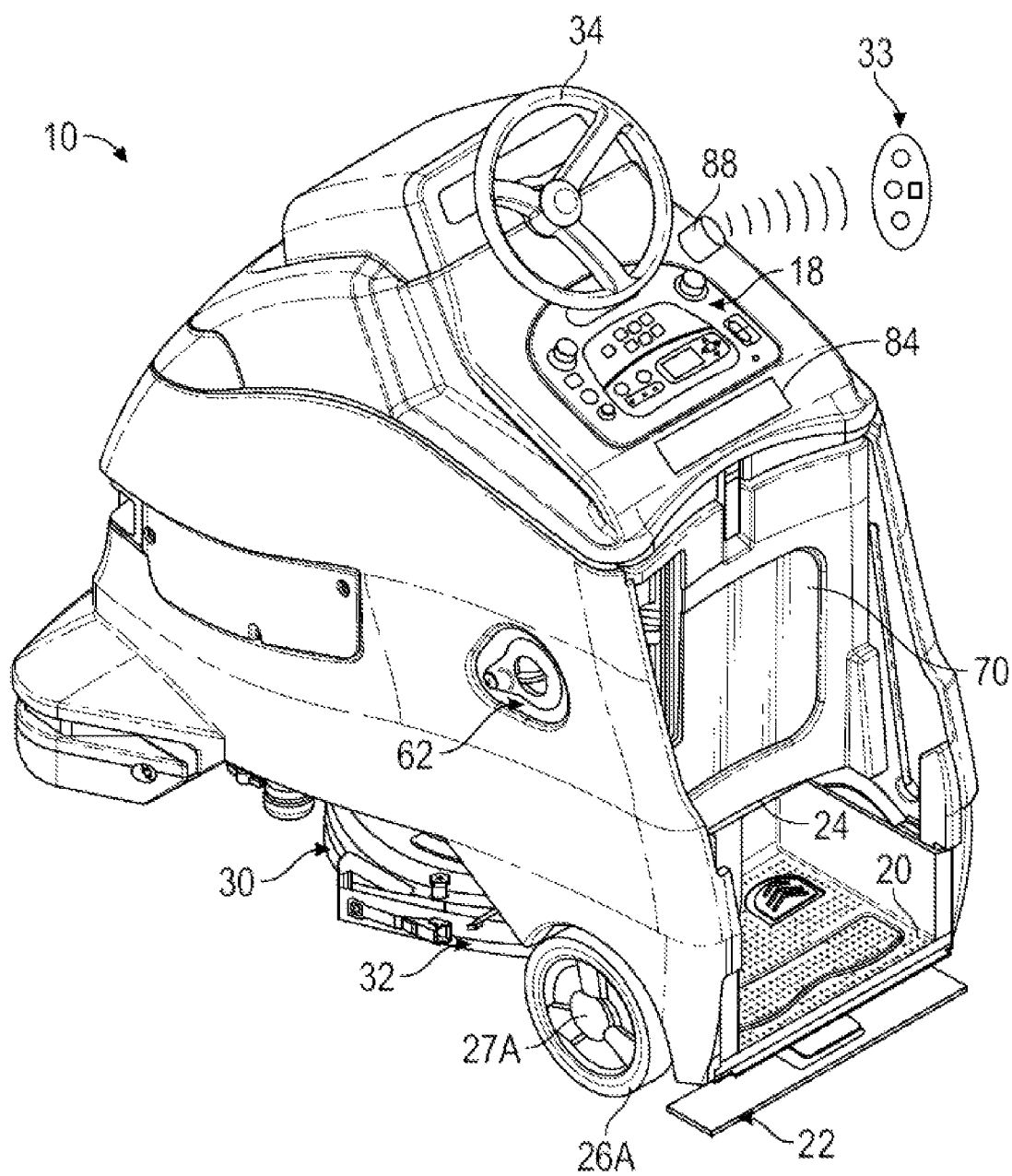
FIG. 2 is a rear perspective view of the robotic floor cleaning machine of FIG. 1 showing a control panel, an operator platform and a trailing mop pad.

FIG. 1 is a front perspective view of floor cleaning machine 10 having optical sensors 12A and 12B, distance sensors 14A and 14B, and a status light system 16. FIG. 2 is a rear perspective view of floor cleaning machine 10 of FIG. 1 showing control panel 18, operator platform 20, and trailing mop system 22. Floor cleaning machine 10 can include chassis 24 to which rear wheels 26A, 26B and front 28 can be connected. Chassis 24 can support various cleaning devices, such as trailing mop system 22, scrubber 30 and squeegee 32. Chassis 24 can be connected to or form part of operator platform 20. Control panel 18 can be in electronic communication with remote device 33. FIGS. 1 and 2 are discussed concurrently.

Floor cleaning machine 10 can be configured to clean, treat, scrub, or polish a floor surface, or perform other similar actions using, for example, trailing mop system 22, scrubber 30 and squeegee 32. An operator can stand on operator platform 20 and control floor cleaning machine 10 using control panel 18 and steering wheel 34. Alternatively, optical sensors 12A and 12B and distance sensors 14A and 14B, as well as laser scanner 36 and personnel sensors 37A-37C, can allow floor cleaning machine 10 to autonomously drive itself. The present application describes various features that can be used to facilitate autonomous cleaning and autonomous driving of floor cleaning machine 10. The features described in the present application can be applied to any type of floor cleaning equipment, such as scrubbers, sweepers, and extractors, whether autonomous or user operated.

Figure 4A:
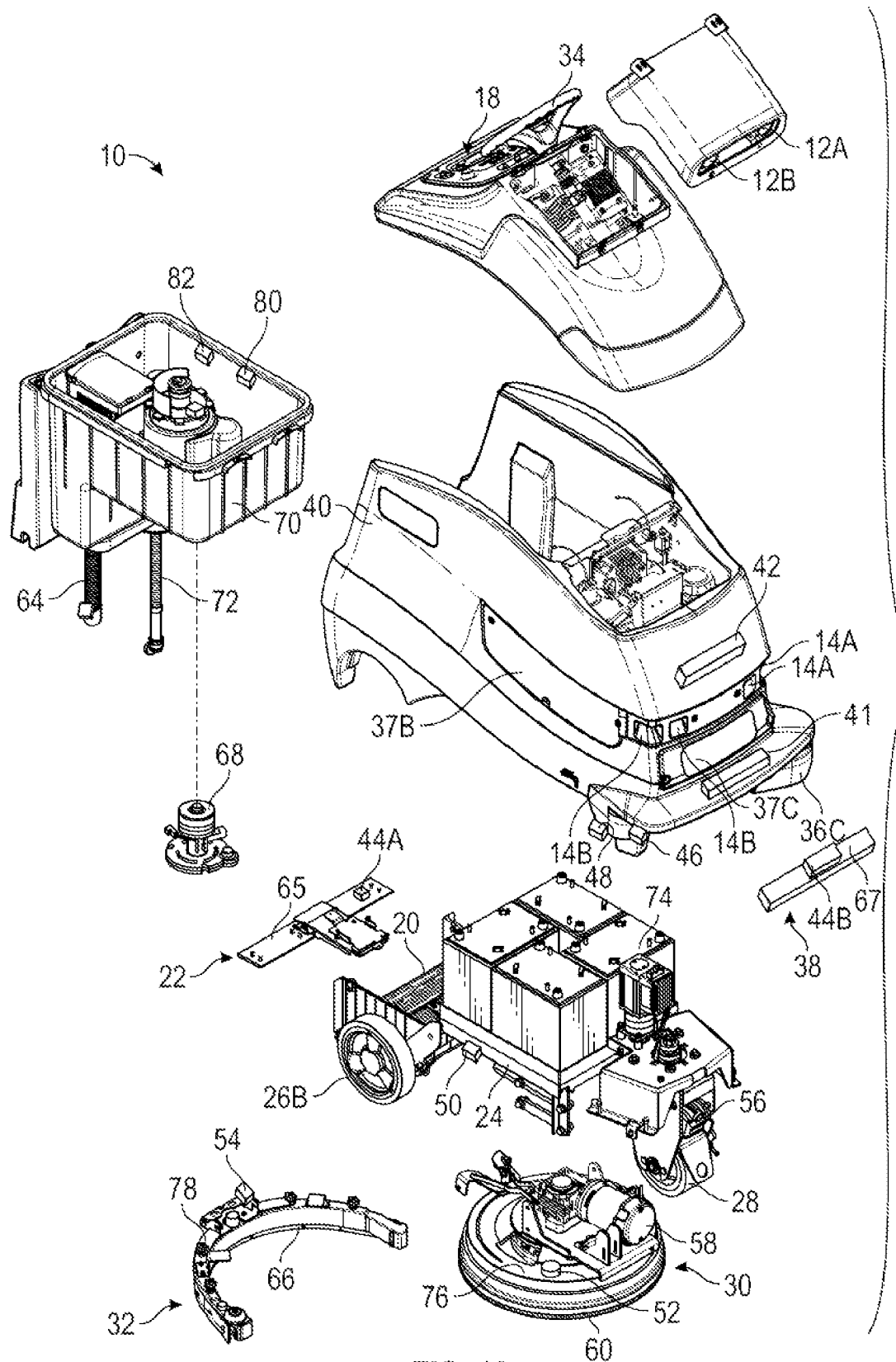
FIG. 4A is an exploded view of the robotic floor cleaning machine of FIG. 3 showing the location of the various sensors and cleaning devices.
Figure 4B:
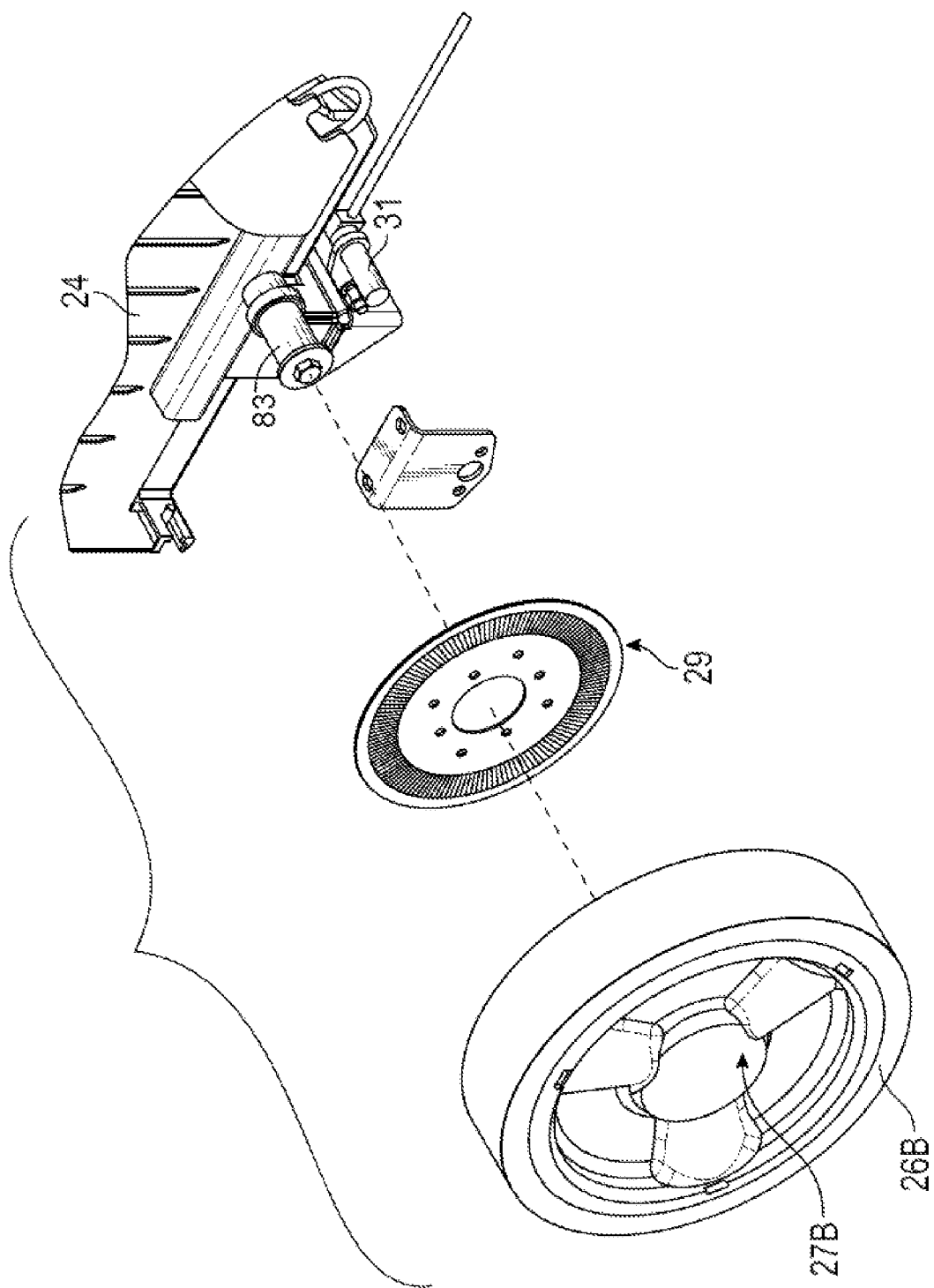
FIG. 4B is an exploded view of a wheel encoder for a wheel of the robotic floor cleaning machine shown in FIG. 4A.

Platform 10 can support the weight of an operator in a standing position. In other examples, floor cleaning machine 10 can be configured to accommodate a sitting operator. Floor cleaning machine 10 can be of a three wheel design having two rear wheels 26A and 26B generally behind the center of gravity of floor cleaning machine 10 and one front wheel 28 in front of the center of gravity. In an example, operator platform 20 can be located behind the center of gravity. Front wheel 28 can be both a steered wheel and a driven wheel. Front wheel 28 can have a device for determining the angular position of the driving direction about the steering axis. In an example, rear wheels 26A and 26B are not driven but have one or more devices, such as encoders 27A and 27B, respectively, for determining speed of rotation each wheel. In an example, rear wheels 26A and 26B are not driven but have one or more devices such as an encoder for determining speed of rotation each wheel. The angular position of each rear wheel 26A, 26B, and the angular position and steering angle of front wheel 28 can be used to determine the position of floor cleaning machine 10 relative to objects sensed by optical sensors 12A and 12B and distance sensors 14A and 14B, as well as laser scanner 36 in mapping an environment of floor cleaning machine 10. For example, FIG. 4B shows encoder 27B as having counter wheel 29 and optical scanner 31. Optical scanner 31 can count timing or tick marks on counter wheel 29 to determine how many revolutions rear wheel 26B has made when mounted on spindle 83, which can be translated by electronics within control panel 18 to a distance traveled by floor cleaning machine 10, such as by using the diameter of either rear wheel 26A or 26B.

Floor cleaning machine 10 can be electrically operated and can include a battery (e.g., battery 74 of FIG. 4A) for powering the various components of floor cleaning machine 10. Motors within floor cleaning machine 10 (not shown) or steering wheel 34 can be used to turn front wheel 28. Additionally, front wheel 28 can be connected to a prime mover, such as an electric motor (e.g., motor 56 of FIG. 4A), that provides propulsive force to floor cleaning machine 10.

Scrubber 30 can be configured to provide a cleaning action to the floor, such rotary disc, orbital or cylindrical cleaning. Fluid from a liquid cleaning system disposed within main cowling 40 can be dispensed by floor cleaning machine 10 to facilitate scrubbing performed by scrubber 30. Main cowling 40 can be hollow, defined by an outer wall and an inner wall (not shown) defining reservoir 39 in which cleaning fluid can be stored. The liquid system can include a liquid storage tank, a pump system, and spray nozzles, as discussed below. Squeegee 32 can be used to corral or wipe dirty fluid behind scrubber 30 and can be connected to a recovery system having a tank (e.g., tank 70 of FIG. 4A) disposed within main cowling 40. A recovery system can include a suction tube (e.g., hose 64), a suction motor (e.g., motor 68), and a storage tank (e.g., tank 70).

Optical sensors 12A and 12B, distance sensors 14A and 14B, and laser scanner 36, as well as the other sensors described herein, can be collectively referred to as a guidance or navigation system for floor cleaning machine 10 when operatively connected to electronics within control panel 18 as described herein. Floor cleaning machine 10 can also include other types of sensors to facilitate autonomous guidance, such as ambient light sensors. Optical sensors 12A and 12B can comprise video cameras that can record the environment of floor cleaning machine 10. Distance sensors 14A and 14B can comprise active ultrasonic sonar sensors or laser sensors that can generate high-frequency sound waves and evaluate an echo which is received back by the sensor, measuring the time interval between sending the signal and receiving the echo to determine the distance to an object. Distance sensors 14A and 14B, as well as other sensors, can be configured to sense changes in elevation to detect stairs, steps, ledges, or other drop-offs. As such, electronics in control panel 18 can be configured to steer floor cleaning machine 10 away from potential hazards associated with drop-offs from stairs, steps, ledges and the like. Laser scanner 36 can generate three-dimensional data of the space around floor cleaning machine 10. Personnel sensors 37A-37C can be configured as capacitance sensors to detect the presence of people out from floor cleaning machine 10. Personnel sensors 37A-37C can distinguish between a solid object and a fluid or liquid filled object, such as a human, to make decisions concerning the navigation procedures.

Furthermore, optical sensors 12A and 12B, distance sensors 14A and 14B, laser scanner 36, wheel encoders 27A and 27B, and personnel sensors 37A-37C, as well as the various other sensors, cameras or input devices described herein, can be configured to provide redundant or overlapping input to the navigation system of the electronics of control panel 18 regarding the surroundings of floor cleaning machine 10. For example, optical sensors 12A and 12B, distance sensors 14A and 14B, laser scanner 36, wheel encoders 27A and 27B, and personnel sensors 37A-37C, as well as the various other sensors, cameras or input devices described herein, or any combination thereof can be configured to provide the navigation system with distance data to the same object, shape information to the same object, depth information to the same object or other information. As such, control panel 18 and the navigation system will have multiple reference points to build a map for navigation of floor cleaning machine 10 and to prevent floor cleaning machine 10 from entering areas or impacting objects that floor cleaning machine 10 should not enter or impact.

Control panel 18 can be connected to electronics that can be programmed to generate mapping of locations that floor cleaning machine 10 has visited. Thus, as floor cleaning machine 10 is used throughout a facility, control panel 18 can add new places to the map and continuously refine the mapping of existing places, using the angular position of rear wheels 26A, 26B and front wheel 28. Floor cleaning machine 10 can use optical sensors 12A and 12B, distance sensors 14A and 14B, and laser scanner 36 to recognize the surroundings of floor cleaning machine 10 to place floor cleaning machine 10 into the mapped area. Two-dimensional, three-dimensional mapping, or a combination thereof can be logged into memory of electronics connected to control panel 18. Thus, routes for the cleaning paths of floor cleaning machine 10 can be recorded in the mapped area for various cleaning operations. Floor cleaning machine 10 can provide an indication to an operator regarding the status of the location of floor cleaning machine 10 relative to the mapped area. For example, status light system 16 can light up in a particular pattern or color to indicate that floor cleaning machine 10 is in a known location, is currently mapping a new location, is paused, or some other such indication.

Status light system 16 can be provided to communicate various statuses of floor cleaning machine 10 to the operator, other personnel, or other pedestrians in the line-of sight of floor cleaning machine 10 and status light system 16. Status light system 16 can include one or more visual indicators, such as light-emitting diodes (LEDs), light bulbs, or other light sources. The visual indicators can be positioned behind lens 37 to convey information to people in proximity of floor cleaning machine 10. For example, a solid first colored (e.g., white) light can indicate that the machine is ready for operation, a second colored (e.g., green) light can indicate that floor cleaning machine 10 is actively and correctly performing a cleaning operation, a flashing third colored (e.g., blue) light on one side of floor cleaning machine 10 can indicate that floor cleaning machine 10 is about to make a turn to the side of the flashing third colored light, a fourth colored (e.g., yellow) light can indicate that floor cleaning machine 10 has stopped the cleaning process because of a detected or sensed condition, and a fifth colored (e.g., red) light can indicate that floor cleaning machine 10 is malfunctioning. Other types of indicators can also be used to convey information to close-by people, such as digital text displays or audio alarms from a loudspeaker, such as voice prompts and horn sounds. Status light system 16 can be connected to electronics within control panel 18 to receive information from sensors in floor cleaning machine 10 to provide predictive turning information to bystanders. For example, if an object is sensed in the path of floor cleaning machine 10 and control panel 18 calculates that the path of floor cleaning machine 10 needs to be rerouted, status light system 16 can be used to provide information to a bystander that floor cleaning machine 10 will be changing path.

While floor cleaning machine 10 is in a robot or autonomous operating mode, it can be desirable to monitor and facilitate the driving and cleaning operations being executed by the various systems of floor cleaning machine 10. During user operation of floor cleaning machine 10, an operator drives floor cleaning machine 10 to maintain the cleaning path and avoid colliding with stationary and moving objects that are or can potentially become in the driving path of floor cleaning machine 10. Likewise, during user operation of floor cleaning machine 10, an operator is present to utilize sensory input to monitor the cleaning process, such as by watching for small objects in the cleaning path or observing torn squeegees or failing scrub pads. However, during autonomous operation, floor cleaning machine 10 can include various sensing and monitoring equipment as well as various supplementary cleaning equipment to ensure floor cleaning machine 10 autonomously drives in a safe manner and to ensure the cleaning operation continues in a proper and efficient manner. Floor cleaning machine 10 can include remote device 33 that can be carried by a remote operator of floor cleaning machine 10 to receive updates on the operation of floor cleaning machine 10 from control panel 18, or directly from a sensor, or to provide command instructions to control panel 18 or floor cleaning machine 10. For example, fob 90 of FIG. 5 can communicate with control panel 18 via a wireless connection to convey information via visual indicator lights 92A, 92B and 92C or provide instructions via button 93.

In an example, trailing mop system 22 can be used to absorb residual moisture left behind by squeegee 32, if any. For example, squeegee 32 may become compromised such that dirty water from scrubber 30 is not properly transferred to the recovery system by squeegee 32. As such, in the case of autonomous operation of floor cleaning machine 10, it might not become noticed by an operator not at the site of floor cleaning machine 10 that liquid is being left behind. As such trailing mop system 22 can be used to absorb undesirable liquid trailing behind floor cleaning machine 10 during operation. Furthermore, trailing mop system 22 can include a sensor (e.g., 44A of FIGS. 3 and 4) that can alert floor cleaning machine 10 or an operator having remote device 33 in electronic communication with floor cleaning machine 10 of the presence of liquid in trailing mop system 22. As such, a remote operator of floor cleaning machine 10 can be alerted to the possible compromise of a squeegee blade (e.g., blade 66 of FIG. 4A) in squeegee 32.

As will be discussed in greater detail with reference to FIGS. 2-5, floor cleaning machine 10 can be outfitted with a variety of different instruments, systems, sensors and devices to enable and improve the autonomous operation of floor cleaning machine 10. Examples of floor cleaning machine 10 described herein can improve the efficiency of the cleaning or treating operation such as by reducing or eliminating deficient cleaning procedures and executing a consistent cleaning or treating operation, free of variability that can be introduced from procedure imperfections or operator error or variability. Furthermore, examples of floor cleaning machine 10 described herein can improve the efficiency and operation of navigation instructions provided to floor cleaning machine 10 to improve the safety, reliability and cleaning or treating performance of floor cleaning machine 10.

Figure 3:
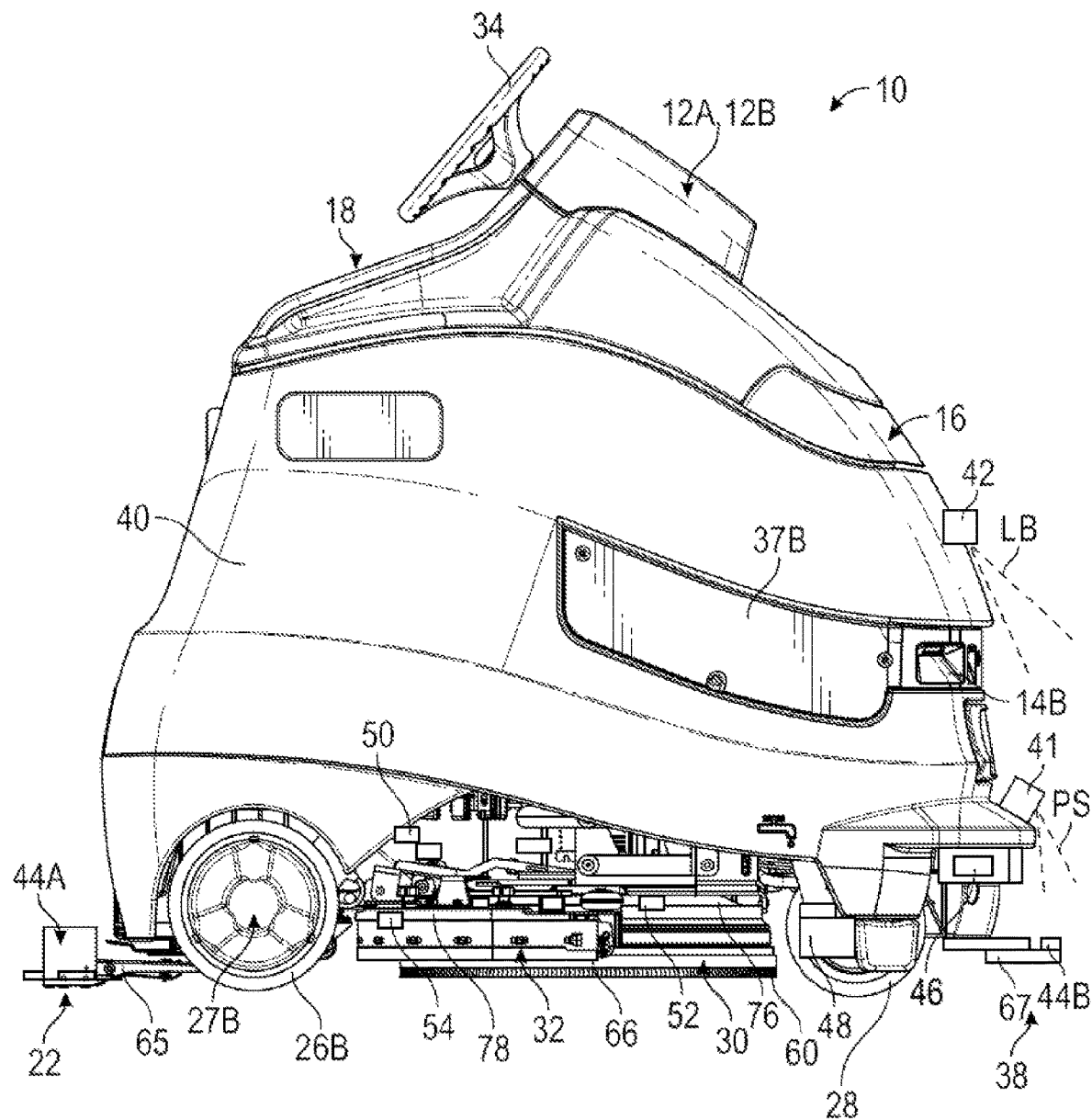
FIG. 3 is a side view of the robotic floor cleaning machine of FIGS. 1 and 2 showing various sensors and cleaning devices that can be added to the robotic floor cleaning machine to facilitate autonomous operation and cleaning of the robotic floor cleaning machine.

FIG. 3 is a side view of floor cleaning machine 10 of FIGS. 1 and 2 showing various sensors and cleaning devices that can be used to automate operation and cleaning of floor cleaning machine 10. FIG. 4A is an exploded view of floor cleaning machine 10 of FIG. 3 showing the location of the various sensors and cleaning devices. FIG. 4B is an exploded view of wheel encoder 27B for rear wheel 26B of robotic floor cleaning machine 10 shown in FIG. 4A.

In addition to trailing mop system 22, floor cleaning machine 10 can include various supplementary cleaning devices, such as front mop 38 and sprayer 41. Floor cleaning machine 10 can also include various hardware and sensors to facilitate and monitor the cleaning and driving operations of floor cleaning machine 10, such as projector 42, sensors 44A and 44B to detect moisture and/or dirt, object recognition sensor 46, floor type sensor 48, vibration sensor 50, cleaning media sensor 52, and squeegee sensor 54. As shown in FIG. 4A, floor cleaning machine 10 can also include tank level sensor 80 and tank condition sensor 82.

During a cleaning operation of floor cleaning machine 10, motor 56 of a propulsion system can be actuated to roll front wheel 28 along the floor surface to be cleaned. While floor cleaning machine 10 is rolling on rear wheels 26A, 26B and front 28, motor 58 of scrubber 30 can be activated to rotate scrubbing pad 60. Cleaning solution or liquid can be added to a storage space within main cowling 40 through cap 62. Cleaning solution or liquid can be dispensed from within main cowling 40 to the area of scrubbing pad 60 via an actuator valve system (not shown), preferably to an area forward of scrubbing pad 60. Hose 64 can be connected to squeegee 32 to vacuum up dirty cleaning solution behind scrubbing pad 60 and in front of blade 66. Motor 68 draws the dirty cleaning solution into tank 70. Motor 68 can also be used to pump dirty cleaning solution out of tank 70 via hose 72. Motors 56, 58 and 68 can receive power from battery 74. Electronics within control panel 18 can be used to operate motors 56, 58 and 68. The electronics within control panel 18 can also be used to operate various sensors and devices on floor cleaning machine 10 to ensure that the dispensing system, scrubber 30, squeegee 32 and the recovery system are functioning correctly and performing a proper cleaning operation.

As discussed above, trailing mop system 22 can be used as a supplementary recovery system for squeegee 32. Trailing mop system 22 can include another cleaning medium such, as a chamois, absorbent roller, sponge, mop, microfiber, or other absorbent material that can contact the floor behind blade 66 of squeegee 32 to wipe any water or fluid that may be left behind. Trialing mop system 22 can include frame member 65 to which the cleaning medium can be mounted. Frame member 65 can have a width approximately as wide as scrubber 30 or squeegee 32. However, frame member 65 can be as wide as the width of floor cleaning machine 10 and the distance between rear wheels 26A and 26B. Trailing mop system 22 and frame member 65 can be mounted to chassis 24 in any suitable manner, either in a fixed manner or an adjustable manner. Trailing mop system 22 can be connected to a motor mechanism (not shown) and can be raised and lowered automatically by a user-initiated input at control panel 18. In other examples, trailing mop system 22 can be raised or lowered manually or added and removed from chassis 24 manually.

Sensor 44A can be provided on or in trailing mop system 22 to determine a moisture level in the cleaning medium or absorbent material. Sensor 44A can be mounted to frame member 65 or can be embedded within the cleaning medium. Sensor 44A can be configured as a moisture sensor, such as by including a pair of electrodes having a resistivity or capacitance that changes as more or less water is present. Sensor 44A can have a sensitivity level configured to indicate if squeegee 32 is trailing excessive water, which can be an indication of a freed or compromised blade 66. For example, sensor 44A can send a moisture signal to control panel 18 and electronics within control panel 18 can be programmed to trigger an alarm (e.g., on remote device 33) for an operator of floor cleaning machine 10 at a threshold that would be above incidental moisture left behind by squeegee 32.

Sensor 44A can also be configured as a dirt sensor to help electronics within control panel 18 make decisions about the cleaning operation. Sensor 44B can be provided at front mop 38 to sense dirt in front of floor cleaning machine 10. Sensors 44A and 44B can be configured as microphones to detect dirt, as is known in the art. Sensors 44A and 44B can also be configured as optical sensors or cameras to view or visually determine the presence of dirt.

With both of sensors 44A and 44B, dirt sensing can take place both before and after floor cleaning machine 10 passes over an area. Comparisons can be made between a before and an after condition to determine a level of cleanliness of the floor and if additional cleaning is needed. For example, an image (e.g., a visible spectrum image, an image outside of humanly visible spectrum, a spectroscopy image) taken by sensor 44B (or object recognition sensor 46) can be compared with an image taken by sensor 44A to determine how effective scrubber 30 and squeegee 32 are currently performing. The dirt sensing method can also comprise comparing an image with a known baseline image, which can be a reference image of the actual floor that floor cleaning machine 10 is cleaning. For example, an image of a clean floor surface stored in memory within control panel 18 or object recognition sensor 46 can be compared with real time images taken by sensor 44A Electronics within control panel 18 can be programmed to ignore variables or imperfections in the floor, such as from painted stripes or grout lines. Comparisons between the before or reference image and the after image can be made either continuously in real-time or intermittently over programmed intervals to determine the cleanliness of the floor. For example, a dark area in the before image can indicate a dirty area that needs to be cleaned. If the dark area remains in the after image, control panel 18 can trigger an operator alarm (e.g., on remote device 33).

Also, if a dirty area is detected in front of floor cleaning machine 10, electronics within control panel 18 can take corrective action in a predictive manner. If control panel 18 detects a dirty area ahead of floor cleaning machine 10, control panel can adjust the cleaning operation to be performed by scrubber 30, squeegee 32 or a liquid system. For example, control panel 18 can increase the scrub pressure or quantity of liquid from the liquid system, can increase the concentration of detergent in the cleaning solution, or can slow down the speed of floor cleaning machine 10 to potentially rectify the dirty floor detected by sensor 44B.

Front mop 38 can be connected to chassis 24 to remove objects from the cleaning path of floor cleaning machine 10. Some objects, such as paper clip, scrap of paper, etc., may be too small to be detected by the navigation system and are not necessary to be avoided, e.g., floor cleaning machine 10 does not need to be rerouted around the object. These types of small objects can, however, become trapped under blade 66 of squeegee 32 and cause water trailing. Front mop 38 can include a cleaning medium, such as a dry mop, broom, damp mop, microfiber, etc. that can be mounted at the front of chassis 24 in front of scrubber 30 to sweep this small debris before scrubbing. Front mop 38 can be connected to a vacuum system, such as that provided by motor 68, or some other collection system to collect debris caught by front mop 38.

Front mop 38 can include frame member 67 to which the cleaning medium can be mounted. Front mop can be connected to chassis 24 via any suitable connection, either in a fixed manner or an adjustable manner. Frame member 67 and the cleaning medium can have a width at least as wide as scrubber 30 or squeegee 32. Frame member 67 can also be as wide as the width of floor cleaning machine 10 and the distance between rear wheels 26A and 26B. However, frame member 67 and the cleaning medium can be configured to be significantly wider than floor cleaning machine 10. A wide mop can be used to complete a pre-sweep operation task more quickly. A mop wider than scrubber 30 or floor cleaning machine 10 can be used to reduce the number of passes required by floor cleaning machine 10 to clean the area. For example, a mop twice as wide as scrubber 30 can be used to sweep the floor in approximately half the time it would take scrubber 30 to clean the same floor area. Additionally, a pre-sweep operation can be conducted at higher speeds of floor cleaning machine 10 as compared to cleaning operations.

In some examples, front mop 38 can be connected to a motor mechanism (not shown) and can be raised and lowered automatically by a user-initiated input at control panel 18. In other examples, front mop 38 can be raised or lowered manually, or added and removed from chassis 24 manually.

Pre-cleaning or sweeping can be performed with front mop 38 as a separate operation prior to scrubbing. Front mop 38 can be ejected or lifted upon completion so scrubbing can be started. In one example, floor cleaning machine 10 can be programmed to perform a pre-sweep of the entire floor area that is to be cleaned. The operator of floor cleaning machine 10 can then remove front mop 38 (or raise front mop 38 from the floor for storage onboard floor cleaning machine 10) and the collected debris before floor cleaning machine 10 is programmed for cleaning using scrubber 03. In another example, front mop 38 can be connected to a vacuum system or some other system to remove the debris and store it for later disposal. Similarly, a wheel driven (unpowered) cylindrical sweeper, or motor driven sweeper, or vacuumized debris recovery system can also be used.

Floor cleaning machine 10 can include object recognition sensor 46, which can provide the ability to recognize what an object is (e.g., a person, pallet of parts, etc.), not just an obstacle that will require a new path. Object recognition sensor 46 can take a picture or image of an object and communicate the image to control panel 18. In an example, control panel 18 can communicate with the Internet or a local area network via a wireless communication network to access a library or database of reference images of known objects for comparison. Electronics within control panel 18 can compare the image obtained by object recognition sensor 46 to images in the reference database. Objects can be compared to determine whether it should be cleaned, should be avoided, or whether an operator should be notified. For example, the database can be provided with images of objects that should be picked-up by floor cleaning machine 10, such as wood chips or paperclips, and objects that should be avoided for later recovery by an operator, such as manufactured parts or coinage. In an example, object recognition sensor 46 comprises a camera that can take images of an object in front of floor cleaning machine 10. If objects are identified that are not in the library, control panel 18 can direct floor cleaning machine 10 to pick-up the object, or, if identified objects are in the library, control panel 18 can direct floor cleaning machine 10 to not pick-up the object. If an object has been identified for not being picked-up, control panel 18 can send a signal to remote device 33 to notify a remote operator that there is an object in the cleaning path that needs to be safely recovered. Control panel 18 can also reroute floor cleaning machine 10 around the object to continue the cleaning operation. Control panel 18 can later direct floor cleaning machine 10 to the location of the identified object to again attempt to clean that portion of the floor.

Floor cleaning machine 10 can include various sensors or devices for detecting whether or not various cleaning instruments, components, sensors or other devices are attached to floor cleaning machine 10. For example, floor cleaning machine 10 can include cleaning media sensor 52. In the illustrated example, cleaning media sensor 52 can be located on a non-rotating component, such as pad housing 76 or a pad skirt, in close proximity to scrubbing pad 60. Cleaning media sensor 52 can be in electronic communication with control panel 18 and can send a signal to control panel 18 if scrubbing pad 60 is not detected. If control panel 18 receives an indication that scrubbing pad 60 is not present, which can indicate scrubbing pad 60 was not mounted to housing 76, not mounted properly to housing 76 or has become separated or partially separated from housing 76 during the cleaning operation, control panel 18 can send a wireless signal to remote device 33 to notify a remote operator of floor cleaning machine 10. Additionally, control panel 18 can stop operation of one or both of scrubber 30 and floor cleaning machine 10.

Likewise, floor cleaning machine 10 can include squeegee sensor 54. In the illustrated example, Squeegee sensor 54 can be located on a frame member of squeegee 32, such as squeegee cover 78, in close proximity to blade 66. Squeegee sensor 54 can be in electronic communication with control panel 18 and can send a signal to control panel 18 if blade 66 is not detected. Also, squeegee sensor 54 can be configured to sense if all of squeegee 32 detaches from floor cleaning machine 10 at corresponding mounting hardware. If control panel 18 receives an indication that blade 66 is not present, which can mean blade 66 was not mounted to squeegee cover 78, not mounted properly to squeegee cover 78 or has become separated or partially separated from squeegee cover 78 during the cleaning operation, control panel 18 can send a wireless signal to remote device 33 to notify a remote operator of floor cleaning machine 10. Additionally, control panel 18 can stop operation of one or both of squeegee 32 and floor cleaning machine 10.

Sensors 52 and 54 can comprise a proximity sensor of any known variety, such as capacitive-, Doppler-, eddy current-, inductive-, laser-, magnetic- and optical-based sensors. Sensors 52 and 54 can be configured to directly sense the cleaning component directly or can be configured to detect an operable component mounted to the cleaning component, such as a reflector or magnet. Sensors 52 and 54 can also be mounted to view or contact the cleaning component through a window in the structural member of floor cleaning machine 10 to which they are mounted.

The recovery system can also include one or more sensors to facilitate operation of the recovery system. For example, tank level sensor 80 and tank condition sensor 82 can be included in the recovery system to communicate information to control panel 18. Tank level sensor 80 can determine the level of liquid or dirty cleaning solution in tank 70. Tank level sensor 80 can determine if tank 70 is full or nearly full. Additionally, tank level sensor 80 can be configured to provide indications of the level of tank 70 as it progresses from being empty to full. In various examples, tank level sensor 80 can determine the level at a plurality of discrete levels or at continuous levels. In an example, tank level sensor 80 can comprise a conventional fluid level sensor, such as an ultrasonic sensor, a capacitive sensor, an optical interface sensor, or a microwave sensor. Tank level sensor 80 and control panel 18 can also be configured to estimate a time remaining before tank 70 is full. In an example, control panel 18 can reduce or shut-off the flow of dirty cleaning solution to tank 70 before activating the closure of a shut-off valve in tank 70 if control panel 18 receives a signal from tank level sensor 80 indicating tank 70 is nearly full or full. Control panel 18 can send a wireless signal to remote device 33 to notify a remote operator of floor cleaning machine 10 that tank 70 is full. Additionally, control panel 18 can stop operation of floor cleaning machine 10 if tank 70 is indicated by tank level sensor 80 as being full. The amount of recovered dirty cleaning liquid may be sensed to determine how long the machine can operate depending on the selected cleaning path(s). Alternatively, tank level sensor 80 or an additional sensor can be positioned within reservoir 39 defined by main cowling 40 to determine an amount of cleaning liquid available and estimate a remaining cleaning time. The sensor in reservoir 39 can be in communication with control panel 18, which can be configured to estimate a time remaining before reservoir 39 is empty.

In another example, tank level sensor 80 can be configured as a dirt sensor for recovered liquid. In such an example, tank level sensor 80 can be configured to detect the level of dirt in the solution, such as by determining how much light can pass through the recovered liquid. Electronics within control panel 18 can compare the signal from tank level sensor 80 to a threshold cleanliness level stored in memory in control panel 18. If excessively dirty water is sensed, control panel 18 can take corrective action in a reactive manner. If control panel 18 detects dirty water, control panel can adjust the cleaning operation to be performed by floor cleaning machine 10. For example, control panel 18 can adjust the route of the cleaning path so that floor cleaning machine 10 makes an additional pass of the dirty area. Control panel 18 can be configured to determine if enough cleaning solution remains in tank 70 to complete a cleaning operation.

Tank condition sensor 82 can be attached to tank 70 to evaluate a condition of tank 70, such as the cleanliness of tank 70. Tank condition sensor 82 can provide an indication at control panel 18 as to whether or not tank 70 needs to be cleaned. In an example, tank condition sensor 82 can be an olfactory sensor that can determine when odor levels reach or exceed a predetermined threshold. In another example, tank condition sensor 82 can be configured as a capacitive sensor positioned on the outside of tank 70 near a drain and can sense if dirt, grime or debris is building up inside tank 70 near the drain. In one scenario, floor cleaning machine 10 could autonomously park itself in a cleaning closet after completing a cleaning operation and have tank 70 full of dirty cleaning solution, which, after a period of time can begin to have an undesirable or unpleasant smell. Tank condition sensor 82 can be used to alert an operator to this condition so that tank 70 can be cleaned.

Floor cleaning machine 10 can be provided with vibration sensor 50 that can be configured to detect potential fault conditions. In an example, vibration sensor 50 can be configured as a microphone that can detect changes in sound that may indicate a fault condition. For example, a microphone can listen for loud or unusual sounds that may be correlated to an object impacting floor cleaning machine 10, grinding of scrubbing pad 60, vibration from an offset scrubbing pad 60, splashing cleaning solution or the like. Sounds monitored by vibration sensor 50 can be compared to a library of sound recordings of various fault conditions for comparison. The library of fault condition sound recordings can be stored in memory in control panel 18 or can be stored remotely in a database (e.g., the Internet or a local area network) that control panel 18 can access via a wireless communicate signal. Vibration sensor 50 can monitor for operation of floor cleaning machine 10 that falls outside of a sound or vibration signature that corresponds to steady state operation. For example, a fault condition might be a vibration frequency that would match vibration of scrubber 30 if scrubbing pad 60 is off center. Vibration sensor 50 can also be positioned and configured to sense loading of operator platform 20. If control panel 18 detects that a passenger has boarded floor cleaning machine 10 during autonomous operation, control panel 18 can be configured to cease operating until the load has been removed.

In another example, vibration sensor 50 can be configured as an accelerometer or other vibration sensor that can detect changes in vibration that may indicate a fault condition. Vibration sensor 50 can be connected to chassis 24 to monitor for undesirable acceleration of floor cleaning machine 10. For example, vibration sensor 50 can monitor for unnecessary or undue acceleration of floor cleaning machine 10 along the cleaning path, which may provide an indication of an undesirable cleaning speed, or vibration sensor 50 can monitor for acceleration of floor cleaning machine 10 in an undesirable direction, such as an upward acceleration when floor cleaning machine 10 impacts a bump. Detected fault conditions can be transmitted to remote device 33 to provide a remote operator an indication that a fault condition may have occurred. Additionally, control panel 18 can stop operation of floor cleaning machine 10 if a sound or vibration is sensed that may be detrimental to floor cleaning machine 10 or the cleaning operation.

Floor cleaning machine 10 can include floor type sensor 48 that can enable control panel 18 to distinguish between different floor surfaces. For example, floor type sensor 48 can be configured to distinguish between floor surfaces of different textures, such as smooth or rough, or resiliency, such as hard or soft. Smooth or hard surfaces can be indicative of concrete or tile, while rough or soft surfaces can be indicative of carpet or turf. In various examples, floor type sensor 48 can comprise a vision system, a sonar sensor, a laser, or other known sensing methods that can be used to distinguish floor types. For example, floor type sensor 48 can measure the reflection of an initial signal to determine a magnitude of the initial signal that is returned to floor type sensor 48, with lower magnitudes of reflected signal possibly indicating softer or rougher surfaces. Signals from floor type sensor 48 can be compared by control panel 18 to a library of known floor type signals that can be stored in control panel 18 or a remote database for comparison over a wireless communication signal. Control panel 18 can include instructions for reacting to signals from floor type sensor 48 indicating sensed floor types. For example, control panel 18 can be programmed to prevent floor cleaning machine 10 from entering a carpeted area when set-up for scrubbing of a hard floor such as concrete. Control panel 18 can send a signal to remote device 33 if it is determined that floor cleaning machine 10 has entered an undesirable or unauthorized area. Additionally, control panel 18 can stop operation of floor cleaning machine 10 if floor cleaning machine 10 enters an area having a floor type that floor cleaning machine 10 has been instructed to avoid.

Floor cleaning machine 10 can include sprayer 41 for operating floor cleaning machine 10 in, for example, a carpet pre-spray mode. A carpet pre-spray mode can be used for pre-spraying carpet prior to cleaning with scrubber 30 or extraction with a vacuum system in examples where a vacuum cleaning system is employed in place of or combination with scrubber 30. Sprayer 41 can be connected to a tank of liquid that can be sprayed onto the floor in front of floor cleaning machine 10 via a nozzle or the like with the use of a pump. In an example, sprayer 41 can use the same liquid as the liquid system stored in the tank within main cowling 40 and can use the same pump as the liquid system uses for providing cleaning solution or liquid to scrubber 30. In another example, floor cleaning machine 10 can use the aforementioned liquid system to perform the pre-spraying operation. Sprayer 41 can also be connected to a detergent tank within the liquid system of floor cleaning machine 10 to apply detergent during the pre-spraying operation. However, sprayer 41 can be used to apply clean water without detergent to perform a clean water rinse.

Pre-spray PS applied by sprayer 41 can be applied along the intended cleaning or extraction path. Floor cleaning machine 10 can follow the intended path before the cleaning or extraction process at a faster or slower pace than what is conducted during the subsequent cleaning or extraction process. Autonomous pre-spraying can facilitate the cleaning operation because pre-spraying can be a difficult operation to manually perform. For example, it can sometimes be difficult for an operator to see where the subsequent paths of floor cleaning machine 10 should be because the pre-spraying dampens and darkens the entire carpeted area, making it difficult to see where the next pre-spraying path should be or making the entire path for subsequent cleaning operation more difficult to see. The pre-spraying operation can save labor expense by freeing the operator to do other tasks while the pre-spraying operation is autonomously performed. Additionally, autonomous performance of the pre-spraying operation can reduce the total time to perform the pre-spraying operation by more precisely executing the pre-spray route, e.g., avoiding double spraying of portion of the floor that can sometimes occur during manual pre-spraying operations.

Floor cleaning machine 10 can include projector 42 that can be configured to project a route of the cleaning path on the floor surface to be cleaned. Projector 42 can be configured to project a laser, LED, or other light source onto the floor ahead of floor cleaning machine 10 to show the intended path of floor cleaning machine 10. The intended path can be projected a short distance (e.g., 2-10 feet/0.61-3.05 m) in front of floor cleaning machine 10 as floor cleaning machine 10 moves along the intended path of the route. Projector 42 can thus facilitate autonomous movement of floor cleaning machine 10 by warning pedestrians and other bystanders of the route that floor cleaning machine 10 is taking. Light beam LB can be projected to the left or right of floor cleaning machine 10 as a turn is approached to notify pedestrians of a forthcoming movement of floor cleaning machine 10.

Remote device 33 can be configured to communicate with control panel 18 and provide a remote operator of floor cleaning machine 10 with information regarding the operation and status of floor cleaning machine 10, including the liquid system, scrubber 30, squeegee 32, the recovery system and the navigation system, as is discussed in greater detail with reference to FIG. 5. Remote device 33 can also be configured to provide a command input to control panel 18 to stop or change operation of floor cleaning machine 10 or the cleaning operation.

Figure 5:
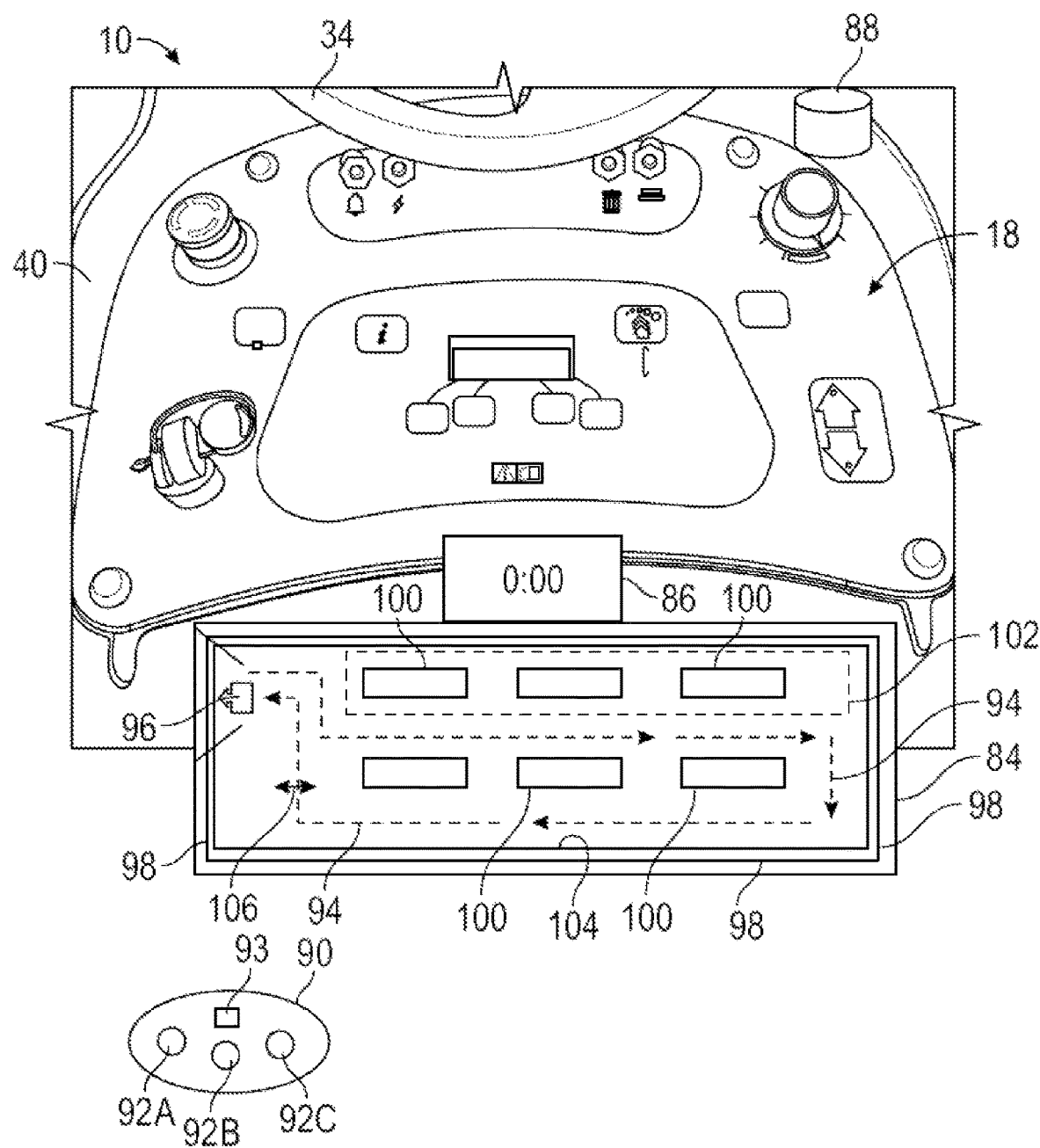
FIG. 5 is a schematic diagram of the control panel for the robotic floor cleaning machine of FIGS. 2 and 3 showing a graphical user interface panel and a wirelessly connected remote device.

FIG. 5 is a schematic diagram of control panel 18 for floor cleaning machine 10 of FIGS. 2 and 3 showing graphical user interface (GUI) panel 84, status bar 86, wireless communication link 88 and wirelessly connected fob 90 having indicator lights 92A, 92B and 92C.

As discussed above, control panel 18 can be configured to operate the various sub-systems, components, sensors and devices of floor cleaning machine 10 from a single location where an operator can stand on operator platform 20. Control panel 18 therefore can include various hardware and software components for operating floor cleaning machine 10. For example, control panel 18 can include user interface devices, processors, memory and the like for receiving input from various items, such a signals from sensors 44A, 44B, 46, 48, 50, 52, 54, 80 and 82, and providing output to various items, such as fob 90 and motors 56, 58 and 68. Control panel 18 can include various forms of digital memory for storing the various libraries and databases described herein, as well as programming for executing various cleaning instructions and commands, as described herein. In one example, control panel 18 can include a portable computing device, such as a tablet computer, as the operator interface.

The portable computing device can be configured to have complete or partial control over the operations of floor cleaning machine 10.

Control panel 18 can include a wireless hub, such as wireless communication link 88, that permits control panel 18 to communicate with devices external to floor cleaning machine 10. Wireless communication link 88 allows control panel 18 to access data and control other devices or autonomous machines.

In one example, wireless communication link 88 communicates with a wireless local area network that permits communication with a local database or server at the location of floor cleaning machine 10 (e.g., within the same facility). In another example, wireless communication link 88 can be a Bluetooth communication device. In another example, wireless communication link 88 is able to connect to the Internet via various public or private signals, such as cellular or 4G networks and the like. Likewise, wireless communication link 88 can be configured to communicate directly with remote device 33 and fob 90, or indirectly, such as through a network or Internet connection.

Fob 90 can comprise a portable device that can be carried by an operator of floor cleaning machine 10 while floor cleaning machine 10 is operating autonomously. In an example, fob 90 is sized and shaped to be small enough to fit into a pocket of an operator of floor cleaning machine 10. As such, fob 90 and wireless communication link 88 can transmit information between each other over a distance so that the operator can leave the immediate vicinity of floor cleaning machine 10 to do other activities, such as in the same facility as floor cleaning machine 10. In examples, fob 90 communicates with Bluetooth or a wireless local area network.

In the example of FIG. 5, fob 90 is configured as a pocket-sized device having three visual indicator lights 92A, 92B and 92C and button 93. In an example, visual indicator light 92A can be a green light, visual indicator light 92B can be a yellow light, and visual indicator light 92C can be a red light. Visual indicator lights 92A, 92B and 92C can be activated by control panel 18 to indicate various statuses of floor cleaning machine 10. For example, a solid green light can indicate floor cleaning machine 10 is operating properly as desired, a red light can indicate that floor cleaning machine 10 has stopped operating and cannot continue without operator interaction, and a yellow light can indicate that floor cleaning machine 10 has encountered a condition that needs operator attention, but that floor cleaning machine 10 can continue to operate. In other examples, visual indicator lights 92A, 92B and 92C can blink in predetermined patterns to provide more specific information, such as a potentially failed blade 66, a potentially failed scrubbing pad 60 or a full tank 70. Visual indicator lights 92A, 92B and 92C can also be turned on to indicate that a cleaning operation has been completed. Additionally, visual indicator lights 92A, 92B and 92C can be turned on to provide information relating to the autonomous navigation of floor cleaning machine 10, such as to provide information that an object is blocking the cleaning route, that floor cleaning machine 10 is lost, or that floor cleaning machine 10 is stalled.

Fob 90 can also include button 93 or other interface components to allow an operator of floor cleaning machine 10 to remotely stop operation of floor cleaning machine 10. Although explained with reference to remote device 33 comprising fob 90, other portable remote devices can be used with control panel 18 and floor cleaning machine 10. In other examples of remote device 33, a handheld or mobile computing device, such as a phone, notebook computer or tablet computer can be used to communicate explicit, textual information to the operator regarding the state of floor cleaning machine 10 or the cleaning operation. In various examples, fob 90 includes a graphical display that can show pictures taken by a camera on floor cleaning machine 10. For example, object recognition sensor 46 can take a picture of an obstruction in front of floor cleaning machine 10 for display on fob 90 for a remote operator to evaluate.

Control panel 18 can visually communicate the intended route for the cleaning path of floor cleaning machine 10 using GUI panel 84. GUI panel 84 can comprise a touch screen as is known in the art, a liquid crystal display or any similar digital or analog screen for communicating information. GUI panel 84 can include indicia in the form of a map, an icon, text, or other identifiable representation. For example, GUI panel 84 can graphically show a representation of cleaning path 94 using machine icon 96 relative to walls 98 and objects 100. GUI panel 84 can allow for an operator to choose between multiple routes or cleaning paths, such as cleaning path 94 and an alternative path.

A route for floor cleaning machine 10, can be programmed by a plurality of different methods. In one example, in a "copy-cat" mode, floor cleaning machine 10 can learn a cleaning path by copying the exact cleaning path driven by an operator using operator platform 20 and steering wheel 34. For example, control panel 18 can learn the turns of cleaning path 94, such as the seven legs of cleaning path 94 shown in FIG. 5. A copy-cat cleaning path can thereby define a driving pattern over the area to be cleaned such that the driving pattern substantially covers the area to be cleaned. Control panel 18 can be programmed to copy cleaning operation steps initiated by an operator during the "copy-cat" mode, such as doubles-scrub actions or changes in cleaning fluid flow rate. Control panel 18, however, can include programming to smooth out the path driven by the operator. For example, control panel 18 can take out slight drifting or back-and-forth driving patterns of the operator or fill in any missed areas by the operator. Control panel 18 can also optimize the overlap of adjacent legs of the cleaning path forming each cleaning path to minimize double cleaning and ensure complete cleaning coverage.

In another example, in a "fill-in" mode, control panel 18 can generate a cleaning path for cleaning the interior area of a perimeter determined by the operator. The operator can drive floor cleaning machine 10 around the outer boundaries of an area and control panel can optimize the cleaning path for floor cleaning machine 10 to clean that area. For example, floor cleaning machine 10 could be driven by an operator adjacent to walls 98 in FIG. 5 to form a rectangular shaped perimeter and control panel 18 could generate the cleaning path, such as by generating the seven legs of cleaning path 94 shown in FIG. 5. Cleaning paths can be generated using A* search algorithms as known in the art, which can provide a path providing complete coverage of the cleaning area within the defined perimeter having the smallest cost (e.g., shortest distance traveled, shortest time, minimum number of overlapping legs, etc.). The operator can also program one or more islands 102 into the area that are no-go or "keep out" zones for floor cleaning machine 10. Thus, because floor cleaning machine 10 will have driven the demarcation lines for the path, floor cleaning machine 10 will also know the distances between the boundaries of the demarcated area and can determine the optimal route and overlap for each leg of the cleaning path. Control panel 18 can provide feedback confirming that the area within the perimeter has been mapped, such as by lighting up status light system 16.

Whether floor cleaning machine 10 utilizes a "copy-cat" mode or a "fill-in" mode can be a user selected option on control panel 18. Control panel 18 can execute the "copy-cat" mode or a "fill-in" mode by utilizing the two-dimensional and three-dimensional mapping conducted by optical sensors 12A and 12B, distance sensors 14A and 14B, and laser scanner 36 described above, as well as the positional data obtained for rear wheels 26A, 26B and front 28. Thus, the location of objects detected by optical sensors 12A and 12B, distance sensors 14A and 14B, and laser scanner 36 can be plotted relative to the location of floor cleaning machine 10 using the positional wheel information.

For rooms or areas that are repetitively cleaned, control panel 18 can be programmed to minimize or mitigate the risk of floor cleaning machine 10 imparting repetitive wear damage to the floor to be cleaned. In one example, control panel 18 can be programmed to plot cleaning path 94 along walls 98 a random distance from walls 98 to form buffer zone 104. Floor cleaning machine 10 can be programmed to nominally space cleaning path 94 a distance of approximately 2 inches (~5 cm) from walls 98, e.g., buffer zone 104 is approximately 2 inches (~5 cm) wide. If the nominal spacing is repeated during subsequent cleaning operations, over time a distinct line can begin to form between the cleaned and un-cleaned area showing the cleaning path. Thus, control panel 18 can be programmed to vary the nominal spacing distance in successive cleaning operations. Cleaning path 94 can be varied inside and outside of the nominal spacing distance. For example, the first time floor cleaning machine 10 cleans a room, the nominal spacing distance can be used; the next time floor cleaning machine 10 cleans that same room, the cleaning path can be moved to be spaced approximately 1.75 inches (~4.5 cm) from the wall; in the next cleaning operation, the cleaning path can be moved to be spaced approximately 2.5 inches (~5.7 cm) from the walls; and so on.

In additional examples, control panel 18 can be programmed to add similar slight variation to the entire path of cleaning path 94, not just those portions along wall 98. For example, a small, random lateral offset 106 can be added to cleaning path 94 of the cleaning path to one or the other side of the middle of cleaning path 94 to avoid visible wear patterns from forming in regularly cleaned areas.

As discussed above, control panel 18 can be programmed to use optical sensors 12A and 12B, distance sensors 14A and 14B, and laser scanner 36 to guide floor cleaning machine 10 autonomously. As such, floor cleaning machine 10 can be programmed to always know where it is within a particular building or facility. Control panel 18 can be programmed to recognize the same objects or type of object repeatedly recognized as being in a cleaning area or in the cleaning path. For example, using input from object recognition sensor 46, control panel 18 can catalogue the frequency that a particular object, such as object 100 or walls 98, is in the cleaning area in the same place. Thus, control panel 18 can learn where permanent objects such as walls or semi-permanent objects, such as vending machines, are located vs. where movable objects, such as chairs, are located. For objects that control panel 18 recognizes as having not moved from previous cleaning operations, control panel 18 can execute the cleaning path route without alteration. For objects that control panel 18 recognizes as typically being in the same place, but not currently in place, control panel 18 can decide to clean the space that is not currently occupied. As an illustration of this example, control panel 18 can recognize that tables in a cafeteria are typically there and can accordingly execute a cleaning path route that travels between the tables. However, if control panel 18 recognizes that one or more of the tables are not present, control panel can recognize that the tables are not present and can make a decision to change the route of the cleaning path to include cleaning the areas where the tables typically reside. For objects that control panel 18 recognizes are in random locations for each cleaning operation, control panel 18 can recognize that these are potentially moving objects and can continue conducting the desired cleaning operation until the recognized object comes within a buffer zone of floor cleaning machine 10, as can be implemented using optical sensors 12A and 12B, distance sensors 14A and 14B, and laser scanner 36. If the identified moving object enters the machine buffer zone, control panel 18 can slow down movement of floor cleaning machine 10 and eventually stop floor cleaning machine 10 if the identified moving object continues to obstruct the cleaning path. Control panel 18 can be programmed to restart the cleaning operation, after a delay period, if the identified moving object is no longer detected. Alternatively, after the delay period, if the identified moving object remains in the cleaning path, control panel 18 can instruct floor cleaning machine 10 to move around the object and restart the cleaning operation along the route (e.g., cleaning path 94) of the cleaning path on the other side of the object. As an illustration of this example, control panel 18 can recognize that a forklift typically operates in a warehouse and can therefore recognize that the forklift may be moving in and out of the cleaning path route, or may be temporarily parked on a single location for a period of time; control panel 18 can therefore take appropriate action to continue the cleaning operation without having to completely stop or wait for operator interaction as the forklift operates in the presence of floor cleaning machine 10.

Control panel 18 can be programmed to perform different actions depending on where it is located, what day of the week the cleaning operation is being performed, or what time of day the cleaning operation is being performed. For example, after floor cleaning machine 10 recognizes where it is at, as previously discussed, control panel 18 can be programmed to change the cleaning operation based on a time of day. For example, if control panel 18 recognizes that floor cleaning machine 10 is located in a warehouse during workday hours, say from 7:00 am to 6:00 pm, control panel 18 can be programmed to conduct a quick cleaning operation that dispenses the least amount of moisture on the floor and takes the least amount of time. However, if control panel 18 recognizes that floor cleaning machine 10 is located in a warehouse during non-workday hours, say from 6:00 pm to 7:00 am, control panel 18 can be programmed to conduct a more thorough cleaning operation that might be slower and dispenses a greater amount of moisture on the floor. Factors that can be adjusted by control panel 18 to adjust the speed and thoroughness of the cleaning operation can include flow rate of the cleaning solution, brush pressure, speed of floor cleaning machine 10, use of cleaning additives, etc. Furthermore, control panel 18 can be configured to self-start a particular cleaning operation at scheduled times and intervals. For example, the aforementioned quick cleaning operation can be programmed into control panel 18 to be autonomously executed at 2:00 pm during a break period of a workday, while the aforementioned more thorough cleaning operation can be programmed into control panel 18 to be autonomously executed at 2:00 am while the warehouse is unoccupied.

In another example, floor cleaning machine 10 can park itself in a docking station. The docking station can be configured to autonomously reload floor cleaning machine 10 for additional operations. For example, the docking station can be configured to wirelessly or with wires recharge battery 74, fill battery 74, fill the solution tank within main cowling 40, drain tank 70, rinse tank 70, clean and/or change cleaning mediums, such as scrubbing pad 60, fill a detergent tank, and perform other maintenance or diagnostic procedures.

Control panel 18 can be programmed to provide status updates to an operator of floor cleaning machine 10 at GUI panel 84. For example, at least one of the amount of time, the amount of solution, or the battery capacity needed to complete a selected cleaning operation can be displayed at status bar 86. GUI panel 84 can also provide an indication of there is sufficient time, such as before workday hours begin, to complete the selected cleaning operation, or sufficient battery power or cleaning solution to complete the selected cleaning operation. As such, control panel 18 can be operatively coupled to battery 74, tank 70, the tank within main cowling 40 and other sensors of floor cleaning machine 10 and GUI panel 84.

Additionally, control panel 18 can be programmed to provide remote device 33, such as fob 90, a status update, including a project completion status or estimate. Control panel 18 can estimate how much time will be required to complete the selected cleaning operation and can communicate to fob 90 an indication that the cleaning operation is complete, such as by flashing all three of visual indicator lights 92A-92C or flashing all three of visual indicator lights 92A-92C. Additionally, control panel 18 can provide a warning that the cleaning operation is about to be complete, such as by flashing one or more of visual indicator lights 92A-92C at preset amount of time, such as five minute, before the cleaning operation is complete. The completion warning can allow the operator of floor cleaning machine 10 time to travel to floor cleaning machine 10 so that the operator can arrive before or at the time floor cleaning machine 10 will be ceasing operation. Remote device 33 can also be configured to vibrate or produce an audible sound to alert a remote operator of floor cleaning machine 10 to a condition of the driving or cleaning process.

Figure 6:
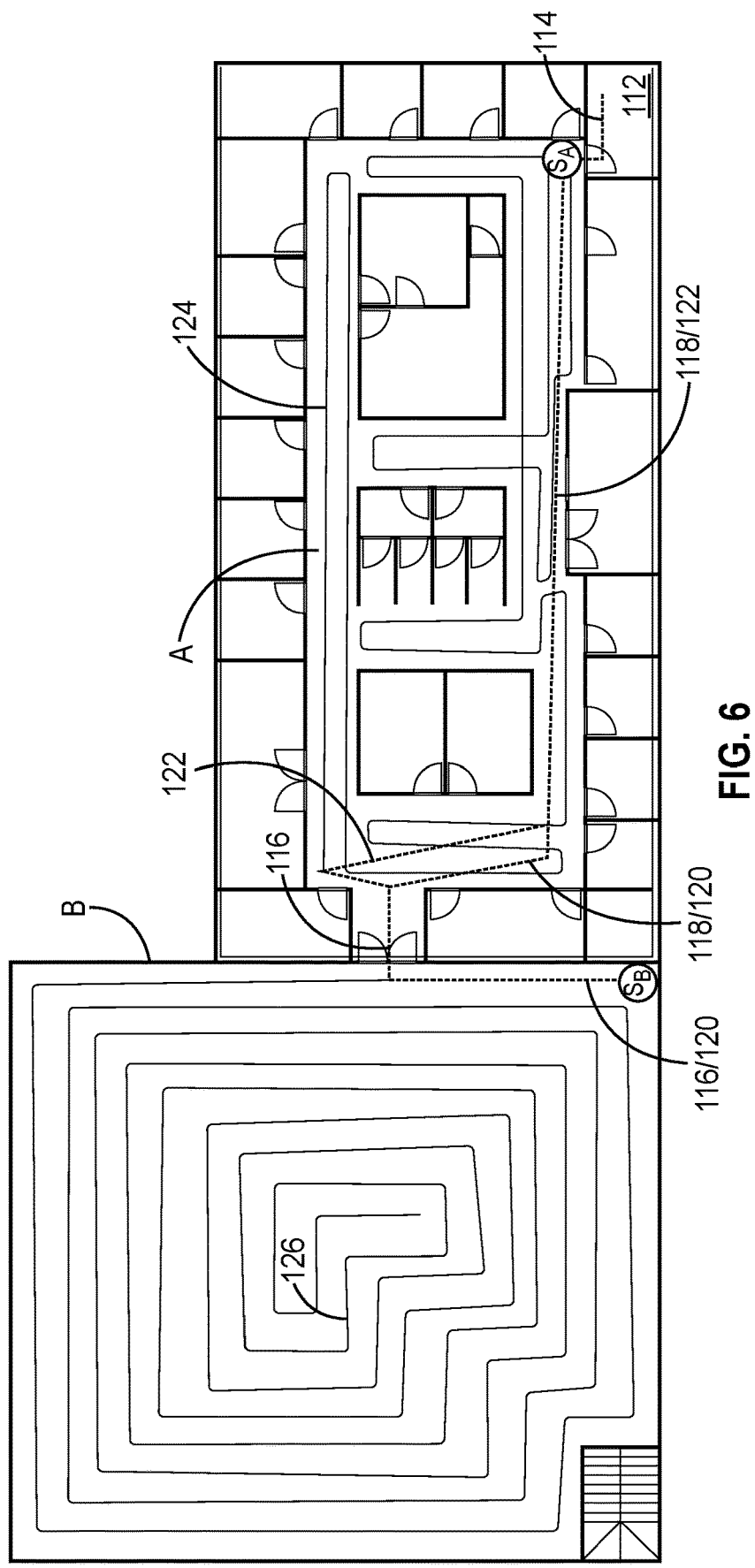
FIG. 6 is a plan view of a plurality of cleaning paths and transport paths of the robotic floor cleaning machine of FIG. 3, which can be combined to define a plurality of cleaning routes.

FIG. 6 is a plan view of a defined route 110 of cleaning floor cleaning machine 10 of FIGS. 2 and 3 showing docking station 112, transport paths 114, 116, 118, 120, 122, and cleaning paths 124, 126 in areas A and B, respectively. Docking station 112 provides a parking location for floor cleaning machine 10 when floor cleaning machine 10 is not in use. Transport paths 114, 116, 118, 120, 122 define a path for transport of cleaning floor cleaning machine 10 without active cleaning, whereas cleaning paths 124, 126 define a path for a cleaning operation. Any combination of transport paths 114, 116, 118, 120, 122 and cleaning paths 124, 126 can be combined in series to define a cleaning route.

As previously described, docking station 112 can be configured to autonomously reload floor cleaning machine 10 for additional operations. For example, the docking station can be configured to wirelessly or with wires recharge battery 74, fill battery 74, fill the solution tank within main cowling 40, drain tank 70, rinse tank 70, clean and/or change cleaning mediums, such as scrubbing pad 60, fill a detergent tank, and perform other maintenance or diagnostic procedures. A location tag (not shown) can be provided at docking station 112 to enable floor cleaning machine 10 to identify its location within a building or complex once an operator has scanned the location tag. In some embodiments, multiple docking stations 112 with unique location tags can be provided for storage of a single floor cleaning machine 10 at different locations of a building or complex.

Transport paths 114, 116, 118, 120, 122 and cleaning paths 124, 126 can be recorded and programmed into control panel 18. Transport paths 114, 116, 118, 120, 122 provide a path for transporting floor cleaning machine 10 to an area to be cleaned or to a docking station 112. Transport paths can connect docking station 112 to starting and ending locations of one or more cleaning paths and can connect two cleaning paths. Transport paths 114, 116, 118, 120, 122 can be programmed using a copy-cat mode as described with respect to FIG. 5 in which control panel 18 records the path driven by an operator using operator platform 20 and steering wheel 34. An operator can drive and record multiple transport paths, which may overlap. As illustrated in FIG. 6, transport path 114 connects docking station 112 to a starting location SA of cleaning path 124. Transport path 116 connects an ending location of cleaning path 124 with a starting location $S_B$ of cleaning path 126. Transport path 118 connects docking station 112 with the starting location of cleaning path 126. Transport path 120 connects an ending location of cleaning path 126 with docking station 112. Transport path 122 connects an ending location of cleaning path 124 with docking station 112.

Cleaning paths 124, 126 can be defined using fill-in or copy-cat modes as described with respect to FIG. 5. As illustrated in FIG. 6, cleaning path 124 is defined using a copy-cat mode, in which a full driving pattern and cleaning operation steps are defined by the operator and recorded such that when cleaning path 124 is executed, floor cleaning machine 10 follows the recorded driving pattern and cleaning operation instructions. Cleaning path 126 is defined using a fill-in mode, in which an operator defines a perimeter or boundary of the area to be cleaned and control panel 18 defines a cleaning path within that perimeter or boundary for floor cleaning machine 10 to clean that area. For example, floor cleaning machine 10 can be driven by an operator along the walls of the room to define a perimeter of the area to be cleaned. The operator can further define the cleaning operation to be used in execution of cleaning path 126. The operator-defined perimeter or boundary can be recorded and programmed into control panel 18. When cleaning path 126 is executed, control panel 18 can generate a map of the area to be cleaned within the recorded perimeter and define a driving pattern within the defined perimeter to cover the area to be cleaned thereby fully defining cleaning path 126. The driving pattern can be defined by control panel 18 using an A* algorithm as known in the art for defining and optimizing paths within a defined area or between defined nodes. In some examples, cleaning path 126, including both the operator-defined perimeter or boundary and the control panel-defined driving pattern, can be recorded and stored for subsequent use.

A single room or area to be cleaned can have multiple unique and overlapping recorded cleaning paths. For example, a separate cleaning path limited to high-traffic areas of a space can be defined for spot cleaning. Additionally, an area to be cleaned can be defined by multiple unique and non-overlapping recorded cleaning paths. For example, an area of a room having furniture may be defined by a copy-cat mode while an open portion of the room free of furniture can be defined by a fill-in mode. The two recorded cleaning paths can be directly connected or connected by a transport path.

Regardless of the mode in which cleaning paths 124, 126 are defined, floor cleaning machine 10 is capable of making real-time adjustments to a recorded driving pattern, as previously described, to avoid obstacles not present in previous executions of cleaning paths 124, 126 as well as transport paths 114, 116, 118, 120, 122. As previously described, when operating autonomously, floor cleaning machine 10 can additionally alert a remote operator of obstacles in both transport paths 114, 116, 118, 120, 122 and cleaning paths 124, 126 as well as provide machine status alerts (e.g., malfunctions, full reservoir tank, etc.).

Any combination of recorded transport paths and recorded cleaning paths can be combined in series to define a cleaning route. Control panel 18 can be programmed to execute an operator-defined route including one or more recorded transport paths and recorded cleaning paths. For example, an operator can select one or more recorded transport paths, cleaning paths including cleaning operation, and a sequence of the selected recorded transport paths and cleaning paths using GUI panel 84. In an example, an operator can scan the location tag at the location of floor cleaning machine 10, which can be transmitted to control panel 18, and select, in sequential order, transport path 114, cleaning path 124, and transport path 122 to clean area A illustrated in FIG. 6. Alternatively, an operator can select, in sequential order, transport path 114, cleaning path 124, transport path 118, cleaning path 126, and transport path 120 to clean areas A and B. An operator can select any available recorded transport paths and cleaning paths.

Alternatively, an operator can select one or more recorded cleaning paths using GUI panel 84 and control panel 18 can define a cleaning route including transport paths to and between selected cleaning paths and a sequential order for cleaning. Control panel 18 can define a cleaning route based on the recorded starting location of floor cleaning machine 10. The starting location can be selected by the operator. In some examples, control panel 18 can define a cleaning route based on a battery power available for operation of floor cleaning machine 10 and an estimated battery power usage for each of the operator-selected cleaning paths and recorded transport paths or estimated associated operation time. Each recorded cleaning path and each recorded transport path can have an estimated associated battery power usage or associated operation time. Control panel 18 can compare the battery power available for floor cleaning machine 10 and determine the least costly (lowest power use) cleaning route. Additionally, control panel 18 can define a cleaning route based on an estimated associated cleaning liquid volume usage or associated return reservoir volume. Each cleaning path can have an estimated associated cleaning liquid volume usage or return reservoir volume. Control panel 18 can compare a volume of cleaning liquid available in floor cleaning machine 10 or a current return reservoir fill level (e.g., tank 70) and define a cleaning path that minimizes cleaning interruption. For example, if floor cleaning machine 10 has enough cleaning liquid to clean area A in FIG. 6 but not both areas A and B, control panel 18 may define a cleaning route that directs floor cleaning machine 10 back to docking station 112 via transport path 122 following cleaning of area A for refilling cleaning fluid before directing floor cleaning machine 10 to area B via transport path 118.

Should cleaning fluid be consumed or battery power run low before floor cleaning machine 10 has completed a defined cleaning route, a fault condition can be triggered and floor cleaning machine 10 can be programmed to return to docking station 112 or predetermined safe location to autonomously correct the fault or wait for manual intervention. For example, floor cleaning machine 10 can return to docking station 112 to autonomously correct the fault by emptying tank 70, refilling the cleaning solution tank within main cowling 40, or recharging battery 74. Alternatively, floor cleaning machine 10 can return to docking station 112 or to a predetermined safe location, alert an operator to the presence of the fault condition, and wait for manual intervention. Once the fault is corrected, floor cleaning machine 10 can autonomously return to the location where the fault detection was detected or a predetermined start location and resume operation. Floor cleaning machine 10 can maintain a regularly updated map of the facility that includes the location of docking station 112 or other predetermined safe locations. The location of a fault can be tagged in the map and an A* algorithm can be used to determine a path from the location of the fault to docking station 112 or other predetermined safe location. Fault locations can be saved to floor cleaning machine 10, to a cloud-based data storage service, or to a combination thereof.

In another example, an operator can select recorded cleaning path and a sequential order for cleaning and control panel 18 can determine which transport paths to use. Control panel 18 can define cleaning routes using an A* algorithm, or alternative planning algorithm, which can define start and end points of each cleaning path and transport path. The path planning algorithm uses a map of the facility and the selected plan orders to create linked transports paths. In another embodiment, an optimization algorithm finds a solution between all the selected paths which optimizes for one of more of travel time, energy consumption, cleaning speed.

Control panel 18 can be programmed to coordinate operation of floor cleaning machine 10 with other robotic floor cleaning machines. In an example, control panel 18 can include hardware to permit floor cleaning machine 10 to transmit a signal that scans for signals from other machines using similar hardware in a similar control panel as control panel 18. Once the machines recognize each other, they can be programmed to communicate and exchange information. For example, control panel 18 can include a Bluetooth transmitter, or another wireless communication device, to recognize when there are one or more additional floor cleaning machines operating in a common area so that control panel 18 can coordinate execution of the cleaning operation with the other machines. In an example, the route (e.g., cleaning path 94) of the cleaning path can be divided between machines to expedite execution of the cleaning operation, e.g., reduce the time it takes to carry out the cleaning operation. In an example, the entire cleaning plan can be shared amongst all of the machines, or only a portion of the route of the cleaning path can be communicated to particular machines for cleaning only a portion of the total area to be cleaned. The communication between machines can ensure that the machines do not interfere with operation of each other. For example, each machine can have only a portion of the route of the cleaning path so that they do not collide along the route. Also, the communication between machines can actively communicate to prevent collisions, such as by actively communicating the location of each connected machine to every other machine with a common frame of reference, such as the floor surface to be cleaned or the route of the cleaning path. The location of each machine can be transmitted in coordinate form or the like for plotting or locating in the mapped area.

Additionally, floor cleaning machine 10 can be configured to operate with other autonomous guided vehicle (AGV) systems that are different than floor cleaning machine 10. As such, control panel 18 can include various communication systems for transmitting and receiving information using a plurality of protocols. For example, other vehicles, such as fork trucks, delivery vehicles, etc., might be working or operating in the same area as floor cleaning machine 10. Control panel 18 can be used to communicate the location of floor cleaning machine 10 to these vehicles in a format those vehicles can use to make adjustments to their operation, e.g., avoid collisions, engage a vehicle-passing protocol, etc. Likewise, control panel 18 can adjust the operation of floor cleaning machine 10 to avoid collision with other AGVs.

Floor cleaning machine 10 can be provided with the navigation system described herein as a modular kit. Optical sensors 12A and 12B, distance sensors 14A and 14B and laser scanner 36, as well as the other sensors and devices described herein, can be connected to floor cleaning machine 10 using releasable couplers, such as suction cups, ball and socket couplers and the like, such that the devices can be attached to different machines. Likewise, the electronics of control panel 18 and other components and wiring of floor cleaning machine 10 and the navigation system can be provided with wire harnesses and connectors that allow for quick and easy physical and electrical installation of components to a machine. Control panel 18 can be programmed to utilize optical sensors 12A and 12B, distance sensors 14A and 14B and laser scanner 36 with different machines. In particular, the various geometric footprints, envelopes and dimensions of any particular machine can be entered into memory in control panel 18. For example, the different length, width, and height dimensions, wheel configurations (e.g., wheelbase), and cleaning deck configurations (e.g., deck width) can be entered and stored into control panel 18 to change how the navigation software within control panel 18 determines the navigation and cleaning commands, such as turning radius and distances from objects. Optical sensors 12A and 12B, distance sensors 14A and 14B and laser scanner 36, as well as the other sensors and devices described herein, can also be adapted to operate with different machines via software or firmware configurations based on the entered footprints, envelopes and dimensions. Control panel 18 can include user input options to allow an operator to input the particular parameters of a machine to be used with the modular navigation system. Alternatively, control panel 18 can be automatically updated, such as via firmware, with the particular parameters of a machine from a technician or factory update to avoid data entry errors.

The autonomous or robotic floor cleaning equipment described herein provides advantages over manual systems and previous autonomous systems. More efficient autonomous operation provided by the systems and methods described herein can reduce labor costs by allowing an operator of an autonomous cleaning machine to perform other tasks while the autonomous machine operates. Additionally, the cleaning operations can be more consistently or systematically performed, such that spots are not missed or cleaning is duplicated, thereby reducing or eliminating rework. Autonomous machines can also be programmed to concentrate on high-use or particularly dirty areas rather than manual operators that tend to clean all areas equally, including those that have not been dirtied. Autonomous cleaning system are particularly advantageous for use in large open areas where the cleaning operation involves long intervals of repeated, back-and-forth operations. The systems and methods described herein facilitate and improve autonomous navigation and autonomous cleaning operations to expand the advantageous use of autonomous cleaning machines to other spaces that are not as simply cleaned as open areas. For example, systems and methods described herein allow the autonomous cleaning machine to be used in tight spaces that may utilize unique, non-repetitive route instructions or in spaces where pedestrian traffic might be present. The systems and methods of autonomous navigation and cleaning described herein can also reduce cleaning time of autonomous machines be reducing the amount of time the autonomous machine may be performing an ineffective cleaning operation, such as when a cleaning pad or squeegee blade fails.

Various Notes & Examples

Example 1 can include or use subject matter such as a control system for a robotic floor cleaning machine configured to perform a cleaning operation along a cleaning path, the control system comprising: a controller configured to control autonomous movement of the robotic floor cleaning machine along the cleaning path and autonomous performance of the cleaning operation; and a plurality of sensors configured to sense a location of the robotic floor cleaning machine relative to surroundings of the robotic floor cleaning machine; wherein at least two sensors from the plurality of sensors are configured to locate the robotic floor cleaning machine in overlapping areas of the surroundings.

Example 2 can include or can optionally be combined with the subject matter of Example 1, to optionally include a plurality of sensors that can be selected from the group consisting of: laser sensors, sonar sensors, stereo camera sensors, infrared sensors, capacitive sensors, and wheel position sensor sensors.

Example 3 can include or can optionally be combined with the subject matter of one or any combination of Examples 1 or 2 to optionally include at least two sensors that can comprise: a dirt sensor configured to detect objects alongside the machine along the cleaning path; and a capacitance sensor configured to detect objects alongside the machine above the cleaning path.

Example 4 can include or can optionally be combined with the subject matter of one or any combination of Examples 1 through 3 to optionally include at least two sensors that can comprise: a laser scanner configured to map the surroundings alongside the machine; and an optical sensor configured to visually record the surroundings alongside the machine.

Example 5 can include or can optionally be combined with the subject matter of one or any combination of Examples 1 through 5 to optionally include at least two sensors that can comprise: an object recognition sensor configured to view the presence of objects in the surroundings; and an optical sensor configured to visually record the surrounding alongside the machine.

Example 6 can include or can optionally be combined with the subject matter of one or any combination of Examples 1 through 5 to optionally include at least two sensors that can comprise: a wheel position sensor configured to determine a distance the machine has moved in the surroundings; and a laser sensor configured to sense a distance between the machine and an object in the surroundings.

Example 7 can include or can optionally be combined with the subject matter of one or any combination of Examples 1 through 6 to optionally include a controller further comprising: a chassis configured to move along the cleaning path; a cleaning mechanism mounted to the chassis to perform the cleaning operation; means for facilitating the autonomous performance of the cleaning operation; and means for facilitating the autonomous movement of the chassis.

Example 8 can include or can optionally be combined with the subject matter of one or any combination of Examples 1 through 7 to optionally include means for facilitating autonomous performance of the cleaning operation that can comprise a debris sensor in communication with the controller and positioned to determine debris in the cleaning path for comparison to a baseline reference.

Example 9 can include or can optionally be combined with the subject matter of one or any combination of Examples 1 through 8 to optionally include means for facilitating autonomous performance of the cleaning operation that can further comprise a pre-cleaning operation cleaning medium coupled to a front end of the chassis, wherein the debris sensor is located on the pre-cleaning operation cleaning medium.

Example 10 can include or can optionally be combined with the subject matter of one or any combination of Examples 1 through 9 to optionally include means for facilitating autonomous performance of the cleaning operation that can further comprise a post-cleaning operation cleaning medium coupled to a rear end of the chassis, wherein the debris sensor is located on the post-cleaning operation cleaning medium.

Example 11 can include or can optionally be combined with the subject matter of one or any combination of Examples 1 through 10 to optionally include means for facilitating autonomous performance of the cleaning operation comprises an object recognition sensor comprising a camera in communication with the controller, wherein the controller is configured to compare images of objects from the camera to a database of reference images to identify the objects.

Example 12 can include or can optionally be combined with the subject matter of one or any combination of Examples 1 through 11 to optionally include means for facilitating autonomous performance of the cleaning operation that can comprise a surface recognition sensor comprising a sensor in communication with the controller and configured to recognize a texture of a surface to be cleaned.

Example 13 can include or can optionally be combined with the subject matter of one or any combination of Examples 1 through 12 to optionally include means for facilitating autonomous performance of the cleaning operation that can comprise a vibration sensor in communication with the controller and configured to recognize disruptions in the movement of the chassis.

Example 14 can include or can optionally be combined with the subject matter of one or any combination of Examples 1 through 13 to optionally include means for facilitating autonomous performance of the cleaning operation that can comprise a sensor for the cleaning mechanism in communication with the control system and configured to determine the presence of a cleaning medium connected to the cleaning mechanism.

Example 15 can include or can optionally be combined with the subject matter of one or any combination of Examples 1 through 14 to optionally include means for facilitating autonomous performance of the cleaning operation that can comprise a pre-sprayer in communication with the control system and mounted to a front end of the chassis to spray into the cleaning path.

Example 16 can include or can optionally be combined with the subject matter of one or any combination of Examples 1 through 15 to optionally include a controller that can include a clock and the control system can perform different cleaning operations based on a time of the clock.

Example 17 can include or can optionally be combined with the subject matter of one or any combination of Examples 1 through 16 to optionally include a controller that can include a display and the control system is configured to provide an indication of a magnitude of a parameter required for completing the cleaning operation.

Example 18 can include or can optionally be combined with the subject matter of one or any combination of Examples 1 through 17 to optionally include a controller that can include an electronic communication device and the control system is configured to communicate a route for the cleaning path to another robotic floor cleaning machine.

Example 19 can include or can optionally be combined with the subject matter of one or any combination of Examples 1 through 18 to optionally include a status indicator in communication with the control system for providing a visual indication of a status of the robotic floor cleaning machine.

Example 20 can include or can optionally be combined with the subject matter of one or any combination of Examples 1 through 19 to optionally include a portable device configured to wirelessly communicate with the control system and display a status of the robotic floor cleaning machine.

Example 21 can include or can optionally be combined with the subject matter of one or any combination of Examples 1 through 20 to optionally include a projector coupled to the chassis to project an indication of the cleaning path on a surface to be cleaned.

Example 22 can include or can optionally be combined with the subject matter of one or any combination of Examples 1 through 21 to optionally include a controller that can further comprise a display visually indicating a route of the cleaning path.

Example 23 can include or can optionally be combined with the subject matter of one or any combination of Examples 1 through 22 to optionally include a controller that can vary a route for the cleaning path in a predefined area to avoid generating wear patterns.

Example 24 can include or can optionally be combined with the subject matter of one or any combination of Examples 1 through 23 to optionally include a controller that can vary a distance of a route of the cleaning path from a fixed object to avoid generating wear patterns.

Example 25 can include or can optionally be combined with the subject matter of one or any combination of Examples 1 through 24 to optionally include a controller that can vary an overlap of the cleaning path in a route of the cleaning path to avoid generating wear patterns.

Example 26 can include or can optionally be combined with the subject matter of one or any combination of Examples 1 through 25 to optionally include a clock and the control system that can provide a time indicator correlating to a length of time for completing a route of the cleaning path.

Example 27 can include or can optionally be combined with the subject matter of one or any combination of Examples 1 through 26 to optionally include a controller that can include a graphical display that is configured to provide an indication of a magnitude of a parameter required for completing the cleaning operation.

Example 28 can include or can optionally be combined with the subject matter of one or any combination of Examples 1 through 27 to optionally include a sensor for determining the presence of objects in a route of the cleaning path, wherein the control system can make navigation decisions based on a frequency of the objects in the cleaning path.

Example 29 can include or can optionally be combined with the subject matter of one or any combination of Examples 1 through 28 to optionally include a controller that can receive inputs for a size of the chassis that can be used to determine a route for the cleaning path.

Example 30 can include or can optionally be combined with the subject matter of one or any combination of Examples 1 through 29 to optionally include: a propulsion system connected to the chassis to provide movement of the chassis along a cleaning path; a liquid system mounted to the chassis to provide cleaning liquid to the primary cleaning mechanism; and a recovery system mounted to the chassis to recover liquid from the cleaning operation.

Example 31 can include or can optionally be combined with the subject matter of one or any combination of Examples 1 through 30 to optionally include a controller can learn a route for the cleaning path via manual operation of the propulsion system.

Example 32 can include or can optionally be combined with the subject matter of one or any combination of Examples 1 through 31 to optionally include a controller that can determine a route for a cleaning area within a perimeter determined via manual operation of the propulsion system.

Example 33 can include or can optionally be combined with the subject matter of one or any combination of Examples 1 through 32 to optionally include means for facilitating autonomous performance of the cleaning operation that can comprise a sensor for the liquid recovery system in communication with the control system.

Example 34 can include or can optionally be combined with the subject matter of one or any combination of Examples 1 through 20 to optionally include a recovery tank for the recovery system, wherein the sensor for the liquid recovery system can comprise a liquid level sensor for the recovery tank.

Example 35 can include or can optionally be combined with the subject matter of one or any combination of Examples 1 through 34 to optionally include a sensor for the liquid recovery system that can comprise an olfactory sensor for the recovery tank.

Example 36 can include or can optionally be combined with the subject matter of one or any combination of Examples 1 through 35 to optionally include a sensor for the liquid recovery system that can be configured to determine the presence of a squeegee blade connected to the liquid recovery system.

Example 37 can include or can optionally be combined with the subject matter of one or any combination of Examples 1 through 36 to optionally include a recorded transport path defining a path for transport of the robotic floor cleaning machine without active cleaning, a recorded cleaning path defining a path for a cleaning operation, a graphical user interface configured to allow an operator to select the recorded cleaning path, the cleaning operation, or a combination thereof, and a controller configured to define a route comprising the recorded transport path, the recorded cleaning path, or combination thereof, and execute the defined route and the cleaning operation.

Example 38 can be combined with the subject matter of Example 37 to optionally include the cleaning path comprising a path for a cleaning operation selected from a group consisting of a fill-in cleaning path defining a perimeter of an area to be cleaned and a copy-cat cleaning path defining a driving pattern over the area to be cleaned wherein the driving pattern substantially covers the area to be cleaned.

Example 39 can include or can optionally be combined with the subject matter of one or any combination of Examples 37 through 38 to optionally include the recorded transport path being one of a plurality of transport paths, and wherein the recorded cleaning path is one of a plurality of cleaning paths.

Example 40 can include or can optionally be combined with the subject matter of one or any combination of Examples 37 through 39 to optionally include each recorded transport path of the plurality of recorded transport paths connecting a docking station to one recorded cleaning path of the plurality of recorded cleaning paths, connecting two recorded cleaning paths of the plurality of recorded cleaning paths to one another, or combination thereof.

Example 41 can include or can optionally be combined with the subject matter of one or any combination of Examples 37 through 40 to optionally include the controller being configured to define a plurality of routes, wherein each route of the plurality of routes comprises a unique combination of any one or more recorded transport paths of the plurality of the recorded transport paths and any one or more recorded cleaning paths of the plurality of recorded cleaning paths.

Example 42 can include or can optionally be combined with the subject matter of one or any combination of Examples 37 through 41 to optionally include the graphical user interface being configured to allow the operator to select the one or more recorded transport paths, the one or more recorded cleaning paths, and a sequential order of the one or more recorded transport paths and the one or more recorded cleaning paths, and wherein the controller is configured to define the route based on a starting location of the robotic floor cleaning machine, the one or more recorded transport paths, the one or more recorded cleaning paths, or a combination thereof.

Example 43 can include a method of controlling a robotic floor cleaning machine, the method comprising driving, by an operator, the robotic floor cleaning machine along a transport path and a cleaning path; recording the transport path and the cleaning path driven by the operator; defining, with a controller of the robotic floor cleaning machine, the cleaning operation and a route comprising the recorded transport path and the recorded cleaning path; and executing, with the robotic floor cleaning machine, the defined route and the cleaning operation. The transport path defines a path for transport of the robotic floor cleaning machine without active cleaning and the cleaning path defines a path for a cleaning operation.

Example 44 can be combined with the subject matter of Example 43 to further include the cleaning path comprising a path selected from a group consisting of a fill-in cleaning path defining a perimeter of an area to be cleaned and a copy-cat cleaning path defining a driving pattern over the area to be cleaned wherein the driving pattern substantially covers the area to be cleaned.

Example 45 can include or can optionally be combined with the subject matter of one or any combination of Examples 43 and 44 to further include the transport path being one of a plurality of transport paths driven by the operator and recorded, and wherein the cleaning path is one of a plurality of cleaning paths driven by the operator and recorded.

Example 46 can include or can optionally be combined with the subject matter of one or any combination of Examples 43 and 45 to further include each transport path of the plurality of transport paths connecting a docking station and one cleaning path of the plurality of cleaning paths or connecting two cleaning paths of the plurality of cleaning paths.

Example 47 can include or can optionally be combined with the subject matter of one or any combination of Examples 43 and 46 to further include defining, in the controller machine, a plurality of routes, wherein each route of the plurality of routes comprises a unique combination of any one or more transport paths of the plurality of transport paths and any one or more cleaning paths of the plurality of cleaning paths.

Example 48 can include or can optionally be combined with the subject matter of one or any combination of Examples 43 and 47 to further include defining the route comprises programming the route into the controller machine by selecting one or more transport paths, one or more cleaning paths, and a sequential order of the one or more transport paths and the one or more cleaning paths.

Example 49 can include or can optionally be combined with the subject matter of one or any combination of Examples 43 and 48 to further include an operator selecting a starting location of the robotic floor cleaning machine and one or more cleaning paths and wherein the controller defines the route including the one or more cleaning paths and one or more transport paths.

Example 50 can include or can optionally be combined with the subject matter of one or any combination of Examples 43 and 49 to further include each transport path of the plurality of transport paths and each cleaning path of the plurality of cleaning paths including an estimated associated battery power usage, an estimated associated operation time, and an estimated associated cleaning liquid volume usage.

Example 51 can include or can optionally be combined with the subject matter of one or any combination of Examples 43 and 50 to further include the route being defined based on a current battery power available for operation of the robotic floor cleaning machine and on an estimated battery power usage associated with the selected one or more cleaning paths and the one or more transport paths of the defined route.

Example 52 can include or can optionally be combined with the subject matter of one or any combination of Examples 43 and 51 to further include the route being defined based on a current volume of cleaning liquid available on the robotic floor cleaning machine and on an estimated cleaning liquid volume usage associated with the selected one or more cleaning paths.

Example 53 can include or can optionally be combined with the subject matter of one or any combination of Examples 43 and 52 to further include wherein the cleaning operation comprising spraying, sweeping, scrubbing, double-scrub actions, vacuuming, corralling, wiping, sucking, polishing, changing in a scrub pressure, changing a concentration of a detergent, changing a speed of the robotic floor cleaning machine, or changing a flow rate of a cleaning fluid.

Example 54 can include or can optionally be combined with the subject matter of one or any combination of Examples 43 and 53 to further include the cleaning path being a fill-in cleaning path and wherein the method further comprises generating, with the controller machine, a map of the area to be cleaned within the perimeter.

Example 55 can include or can optionally be combined with the subject matter of one or any combination of Examples 43 and 54 to further include the robotic floor cleaning machine comprising a sensor, wherein the sensor comprises at least one of an optical sensor, a distance sensor, a personnel sensor, an ambient light sensor, an ultrasonic sensor, a sonar sensor, a capacitance sensor, a wheel encoder, a dirt sensor, a debris sensor, an object recognition sensor, a floor type sensor, a surface recognition sensor, a vibration sensor, a cleaning media sensor, a squeegee sensor, a tank level sensor, a tank condition sensor, a moisture sensor, an optical interface sensor, a microwave sensor, an olfactory sensor, a stereo camera sensor, an infrared sensor, a wheel position sensor, and a laser scanner.

Example 56 can include or can optionally be combined with the subject matter of one or any combination of Examples 43 and 55 to further include detecting, with the sensor of the robotic floor cleaning machine, a location of an object within the area to be cleaned; and plotting the location of the object relative to a location of the robotic floor cleaning machine in the mapped area based on positional data of the robotic floor cleaning machine.

Each of these non-limiting examples can stand on its own or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of controlling a robotic floor cleaning machine, the method comprising:
   driving, by an operator, the robotic floor cleaning machine along a transport path and a cleaning path, wherein the transport path defines a path for transport of the robotic floor cleaning machine without an active cleaning and the cleaning path defines a path for a cleaning operation, the cleaning path including a plurality of path legs;
   recording the transport path and the cleaning path driven by the operator;
   defining, with a controller of the robotic floor cleaning machine, the cleaning operation and a first route comprising the recorded transport path and the recorded cleaning path;
   executing, with the robotic floor cleaning machine, the defined first route and the cleaning operation;
   defining, with the controller, a second route based upon the recorded cleaning path and including a plurality of path legs corresponding with the plurality of path legs of the recorded cleaning path, wherein path leg of the plurality of path legs of the second route is laterally offset from the corresponding path leg of the plurality of path legs of the recorded cleaning path; and
   executing, with the robotic floor cleaning machine, the defined second route and the cleaning operation.

2. The method of claim 1, wherein the cleaning path comprises a path selected from the group consisting of:
   a fill-in cleaning path defining a perimeter of an area to be cleaned; and
   a copy-cat cleaning path defining a driving pattern over the area to be cleaned wherein the driving pattern substantially covers the area to be cleaned.

3. The method of claim 2, wherein the cleaning operation comprises spraying, sweeping, scrubbing, double-scrub actions, vacuuming, corralling, wiping, sucking, polishing, changing in a scrub pressure, changing a concentration of a detergent, changing a speed of the robotic floor cleaning machine, or changing a flow rate of a cleaning fluid.

4. The method of claim 1, wherein the cleaning path is a fill-in cleaning path and wherein the method further comprises generating, with the controller, a map of the area to be cleaned within the perimeter.

5. The method of claim 4, wherein the robotic floor cleaning machine comprises a sensor, wherein the sensor comprises at least one of an optical sensor, a distance sensor, a personnel sensor, an ambient light sensor, an ultrasonic sensor, a sonar sensor, a capacitance sensor, a wheel encoder, a dirt sensor, a debris sensor, an object recognition sensor, a floor type sensor, a surface recognition sensor, a vibration sensor, a cleaning media sensor, a squeegee sensor, a tank level sensor, a tank condition sensor, a moisture sensor, an optical interface sensor, a microwave sensor, an olfactory sensor, a stereo camera sensor, an infrared sensor, a wheel position sensor, and a laser scanner.

6. The method of claim 5, further comprising:
   detecting, with the sensor of the robotic floor cleaning machine, a location of an object within the area to be cleaned; and
   plotting the location of the object relative to a location of the robotic floor cleaning machine in the mapped area based on positional data of the robotic floor cleaning machine.

7. The method of claim 1, wherein the transport path is one of a plurality of transport paths driven by the operator and recorded, and wherein the cleaning path is one of a plurality of cleaning paths driven by the operator and recorded.

8. The method of claim 7, wherein each transport path of the plurality of transport paths connects a docking station and one cleaning path of the plurality of cleaning paths or connects two cleaning paths of the plurality of cleaning paths.

9. The method of claim 8, and further comprising defining, in the controller, a plurality of routes, wherein each route of the plurality of routes comprises a unique combination of any one or more transport paths of the plurality of the transport paths and any one or more cleaning paths of the plurality of cleaning paths.

10. The method of claim 8, wherein defining the route comprises programming the route into the controller by selecting:
    one or more transport paths;
    one or more cleaning paths; and
    a sequential order of the one or more transport paths and the one or more cleaning paths.

11. The method of claim 8, wherein an operator selects a starting location of the robotic floor cleaning machine and one or more cleaning paths and wherein the controller defines the route including the one or more cleaning paths and the one or more transport paths.

12. The method of claim 11, wherein each transport path of the plurality of transport paths and each cleaning path of the plurality of cleaning paths includes an estimated associated battery power usage, an estimated associated operation time, and an estimated associated cleaning liquid volume usage.

13. The method of claim 12, wherein the route is defined based on a current battery power available for operation of the robotic floor cleaning machine and on an estimated battery power usage associated with the selected one or more cleaning paths and the one or more transport paths of the defined route.

14. The method of claim 11, wherein the route is defined based on a current volume of cleaning liquid available on the robotic floor cleaning machine and on an estimated cleaning liquid volume usage associated with the selected one or more recorded cleaning paths.

15. A robotic floor cleaning machine comprising:
    a recorded transport path stored in a controller, the recorded transport path defining a path for transport of the robotic floor cleaning machine without an active cleaning;
    a recorded cleaning path stored in the controller, the recorded cleaning path defining a path for a cleaning operation, the recorded cleaning path including a plurality of path legs;

a graphical user interface configured to allow an operator to select the recorded cleaning path, the cleaning operation, or a combination thereof; and wherein the controller is configured to:
define a first route comprising the recorded transport path and the recorded cleaning path;
execute the defined first route and the cleaning operation;
define a second route based upon the recorded cleaning path and including a plurality of path legs corresponding with the plurality of path legs of the recorded cleaning path, wherein each path leg of the plurality of path legs of the second route is laterally offset from the corresponding path leg of the plurality of path legs of the recorded cleaning path; and
execute the defined second route and the cleaning operation.

16. The robotic floor cleaning machine of claim 15, wherein the recorded cleaning path comprises a path for cleaning operation selected from the group consisting of:
a fill-in cleaning path defining a perimeter of an area to be cleaned; and
a copy-cat cleaning path defining a driving pattern over the area to be cleaned wherein the driving pattern substantially covers the area to be cleaned.

17. The robotic floor cleaning machine of claim 15 wherein the recorded transport path is one of a plurality of recorded transport paths, and wherein the recorded cleaning path is one of a plurality of recorded cleaning paths; and wherein each recorded transport path of the plurality of recorded transport paths connects a docking station to one recorded cleaning path of the plurality of recorded cleaning paths, connects two recorded cleaning paths of the plurality of recorded cleaning paths to one another, or a combination thereof.

18. The robotic floor cleaning machine of claim 17, wherein the controller is configured to define a plurality of routes, wherein each route of the plurality of routes comprises a unique combination of any one or more recorded transport paths of the plurality of the recorded transport paths and any one or more recorded cleaning paths of the plurality of recorded cleaning paths.

19. The robotic floor cleaning machine of claim 18, wherein the graphical user interface is configured to allow the operator to select one or more recorded transport paths, one or more recorded cleaning paths, and a sequential order of the one or more recorded transport paths and the one or more recorded cleaning paths, and wherein the controller is configured to define a route based on a starting location of the robotic floor cleaning machine, of the one or more recorded transport paths, of the one or more recorded cleaning paths, or a combination thereof.

20. The robotic floor cleaning machine of claim 18, wherein the graphical user interface is configured to allow the operator to select one or more recorded transport paths, one or more recorded cleaning paths, and a sequential order of the one or more recorded transport paths and the one or more recorded cleaning paths, and wherein the controller is configured to define a route based on at least one of:
a current battery power available for operation of the robotic floor cleaning machine and on an estimated battery power usage associated with the selected one or more recorded cleaning paths and the one or more recorded transport paths of the defined route; and
a current volume of cleaning liquid available on the robotic floor cleaning machine and on an estimated cleaning liquid volume usage associated with the selected one or more recorded cleaning paths.

* * * * *